(12) United States Patent
Elenbaas et al.

(10) Patent No.: US 11,960,126 B2
(45) Date of Patent: *Apr. 16, 2024

(54) FIBER OPTIC CONNECTOR LOCKING FEATURE

(71) Applicant: CommScope Technologies LLC, Hickory, NC (US)

(72) Inventors: Jacob Arie Elenbaas, Heijningen (NL); Christopher Charles Taylor, Cheltenham Glos (GB); David Patrick Murray, Bristol (GB); Jan Willem Rietveld, Benschop (NL)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,788

(22) Filed: Jan. 9, 2023

(65) Prior Publication Data

US 2023/0221500 A1 Jul. 13, 2023

Related U.S. Application Data

(63) Continuation of application No. 17/037,904, filed on Sep. 30, 2020, now Pat. No. 11,555,966, which is a continuation of application No. 16/194,918, filed on Nov. 19, 2018, now Pat. No. 10,830,963.

(60) Provisional application No. 62/587,774, filed on Nov. 17, 2017.

(51) Int. Cl.
*G02B 6/36* (2006.01)
*G02B 6/38* (2006.01)

(52) U.S. Cl.
CPC ........... *G02B 6/3878* (2013.01); *G02B 6/387* (2013.01); *G02B 6/3871* (2013.01); *G02B 6/3888* (2021.05); *G02B 6/38875* (2021.05); *G02B 6/3893* (2013.01)

(58) Field of Classification Search
CPC .... G02B 6/3878; G02B 6/387; G02B 6/3871; G02B 6/3888; G02B 6/38875; G02B 6/3893; G02B 6/36
See application file for complete search history.

(56) References Cited

U.S. PATENT DOCUMENTS

| 5,179,608 | A  | 1/1993  | Ziebol et al.   |
|-----------|----|---------|-----------------|
| 6,164,835 | A  | 12/2000 | Masaki          |
| 6,250,817 | B1 | 6/2001  | Lampert et al.  |
| 6,250,949 | B1 | 6/2001  | Lin             |
| 6,364,537 | B1 | 4/2002  | Maynard         |
| 6,409,392 | B1 | 6/2002  | Lampert et al.  |
| 6,565,262 | B2 | 5/2003  | Childers et al. |

(Continued)

FOREIGN PATENT DOCUMENTS

| CN | 203705688 U | 7/2014 |
|----|-------------|--------|
| CN | 102749682 B | 5/2015 |

(Continued)

*Primary Examiner* — Jennifer Doan
(74) *Attorney, Agent, or Firm* — Merchant & Gould P.C.

(57) ABSTRACT

A connector assembly that includes a connector that has a ferrule and a latch. The latch is movable about a connection point. The connector assembly also includes a boot that is removably mounted to the connector. The boot is axially slidable to move the latch. The connector assembly also includes a locking assembly to selectively lock the boot from sliding axially relative to the connector.

14 Claims, 24 Drawing Sheets

(56) References Cited

U.S. PATENT DOCUMENTS

| | | | |
|---|---|---|---|
| 6,702,475 B1 | 3/2004 | Giobbio et al. |
| 6,848,836 B2 | 2/2005 | Ueda et al. |
| 6,863,446 B2 | 3/2005 | Ngo |
| 6,863,556 B2 | 3/2005 | Viklund et al. |
| 7,037,129 B2 | 5/2006 | Lo et al. |
| 7,052,186 B1 | 5/2006 | Bates |
| 7,101,212 B1 | 9/2006 | Larkin |
| 7,163,414 B2 | 1/2007 | Lo et al. |
| 7,297,013 B2 | 11/2007 | Caveney et al. |
| 7,326,075 B1 | 2/2008 | Armstrong et al. |
| 7,329,137 B2 | 2/2008 | Martin et al. |
| 7,354,291 B2 | 4/2008 | Caveney et al. |
| 7,354,292 B1 | 4/2008 | Lloyd et al. |
| 7,438,584 B2 | 10/2008 | Caveney et al. |
| 7,445,484 B2 | 11/2008 | Wu |
| 7,465,180 B2 | 12/2008 | Kusuda et al. |
| 7,473,124 B1 * | 1/2009 | Briant | H01R 13/629 439/352 |
| 7,549,888 B1 | 6/2009 | Armstrong et al. |
| 7,578,690 B2 | 8/2009 | Caveney et al. |
| 7,588,373 B1 | 9/2009 | Sato et al. |
| 7,621,675 B1 | 11/2009 | Bradley |
| 7,641,398 B2 | 1/2010 | O'Riorden et al. |
| 7,762,844 B2 | 7/2010 | Ice |
| 7,806,706 B2 | 10/2010 | Obenshain |
| 7,901,250 B2 | 3/2011 | Lam et al. |
| 7,909,625 B2 | 3/2011 | Obenshain |
| 7,997,806 B2 | 8/2011 | Nakagawa |
| 8,011,834 B2 | 9/2011 | Nakano et al. |
| 8,083,547 B2 | 12/2011 | Roth et al. |
| 8,152,384 B2 | 4/2012 | De Jong et al. |
| 8,152,385 B2 | 4/2012 | De Jong et al. |
| 8,187,018 B2 | 5/2012 | Kosugi |
| 8,221,007 B2 | 7/2012 | Peterhans et al. |
| 8,235,745 B1 | 8/2012 | Armstrong et al. |
| 8,317,408 B2 | 11/2012 | Nakagawa |
| 8,317,532 B2 | 11/2012 | Kosugi |
| 8,382,506 B2 | 2/2013 | Reed et al. |
| 8,465,317 B2 | 6/2013 | Gniadek et al. |
| 8,506,174 B2 | 8/2013 | Nakagawa |
| 8,556,645 B2 * | 10/2013 | Crain | H01R 13/633 438/258 |
| 8,678,669 B2 | 3/2014 | Lee |
| 8,764,308 B2 | 7/2014 | Irwin et al. |
| 8,770,863 B2 | 7/2014 | Cooke et al. |
| 8,827,568 B1 | 9/2014 | Isenhour et al. |
| 8,998,505 B2 | 4/2015 | Motofuji |
| 9,246,262 B2 | 1/2016 | Brown et al. |
| 9,448,370 B2 | 9/2016 | Xue et al. |
| 9,557,495 B2 | 1/2017 | Raven et al. |
| 9,595,786 B1 | 3/2017 | Takano et al. |
| 9,599,778 B2 | 3/2017 | Wong et al. |
| 9,625,658 B1 | 4/2017 | Lin |
| 9,645,324 B2 | 5/2017 | Tikosaka |
| 9,678,283 B1 | 6/2017 | Chang et al. |
| 9,739,955 B2 | 8/2017 | Lee |
| 9,761,998 B2 | 9/2017 | De Dios Martin et al. |
| 9,829,650 B2 | 11/2017 | Irwin et al. |
| 9,869,825 B2 | 1/2018 | Bailey et al. |
| 9,927,582 B2 | 3/2018 | Chang et al. |
| 9,958,621 B2 | 5/2018 | Wong et al. |
| 9,971,102 B2 | 5/2018 | Raven et al. |
| 10,042,129 B2 | 8/2018 | Taira et al. |
| 10,054,747 B2 | 8/2018 | Lee |
| 10,067,301 B2 | 9/2018 | Murray et al. |
| 10,078,186 B1 | 9/2018 | Hsu et al. |
| 10,114,180 B2 | 10/2018 | Suzic |
| 10,156,683 B2 | 12/2018 | Manes et al. |
| 10,158,194 B2 | 12/2018 | Takano et al. |
| 10,228,516 B2 | 3/2019 | Veatch et al. |
| 10,288,819 B2 | 5/2019 | Chang et al. |
| 10,444,444 B2 * | 10/2019 | Ma | G02B 6/3885 |
| 10,520,690 B2 | 12/2019 | Takano et al. |
| 10,527,802 B2 | 1/2020 | Wong et al. |
| 10,585,247 B2 | 3/2020 | Takano et al. |
| 10,620,384 B2 | 4/2020 | Iizumi et al. |
| 10,663,676 B2 | 5/2020 | Takano et al. |
| 10,712,512 B2 | 7/2020 | Ho et al. |
| 10,768,381 B2 | 9/2020 | Li |
| 10,830,963 B2 | 11/2020 | Elenbaas et al. |
| 10,859,778 B2 | 12/2020 | Takano et al. |
| 10,928,594 B2 | 2/2021 | Iizumi et al. |
| 10,976,505 B2 | 4/2021 | Wong et al. |
| 11,061,190 B2 | 7/2021 | Takano et al. |
| 11,079,556 B2 | 8/2021 | Murray et al. |
| 11,079,557 B2 | 8/2021 | Gniadek et al. |
| 11,555,966 B2 | 1/2023 | Elenbaas et al. |
| 2002/0081077 A1 | 6/2002 | Nault |
| 2009/0245732 A1 | 10/2009 | Murano |
| 2010/0081303 A1 | 4/2010 | Roth et al. |
| 2010/0112845 A1 | 5/2010 | Lam et al. |
| 2011/0286702 A1 | 11/2011 | Nielson et al. |
| 2011/0299814 A1 | 12/2011 | Nakagawa |
| 2012/0155610 A1 | 6/2012 | Murakoshi et al. |
| 2012/0301080 A1 | 11/2012 | Gniadek |
| 2012/0308183 A1 | 12/2012 | Irwin et al. |
| 2013/0301992 A1 | 11/2013 | Chayun et al. |
| 2014/0169727 A1 | 6/2014 | Veatch et al. |
| 2014/0178026 A1 | 6/2014 | Welford |
| 2014/0348467 A1 | 11/2014 | Cote et al. |
| 2014/0348481 A1 | 11/2014 | Giraud et al. |
| 2016/0349458 A1 | 12/2016 | Murray et al. |
| 2017/0205586 A1 | 7/2017 | Chang et al. |
| 2019/0391343 A1 | 12/2019 | Aoshima et al. |
| 2020/0064564 A1 | 2/2020 | Ho et al. |
| 2020/0241216 A1 | 7/2020 | Iizumi et al. |
| 2020/0379192 A1 | 12/2020 | Ho et al. |
| 2021/0191050 A1 | 6/2021 | Holmberg |

FOREIGN PATENT DOCUMENTS

| | | |
|---|---|---|
| CN | 103837939 B | 3/2017 |
| CN | 206696473 U | 12/2017 |
| CN | 207164310 U | 3/2018 |
| CN | 106383383 B | 2/2019 |
| CN | 106941222 B | 6/2019 |
| JP | 2005189288 A | 7/2005 |
| JP | 4278148 B2 | 6/2009 |
| JP | 2012-128341 A | 7/2012 |
| JP | 4995305 B2 | 8/2012 |
| JP | 5085694 B2 | 11/2012 |
| JP | 5275953 B2 | 5/2013 |
| TW | 201723546 A | 7/2017 |
| WO | 2012/151175 A2 | 11/2012 |
| WO | 2015/140821 A1 | 9/2015 |
| WO | 2019/038641 A1 | 2/2019 |

* cited by examiner

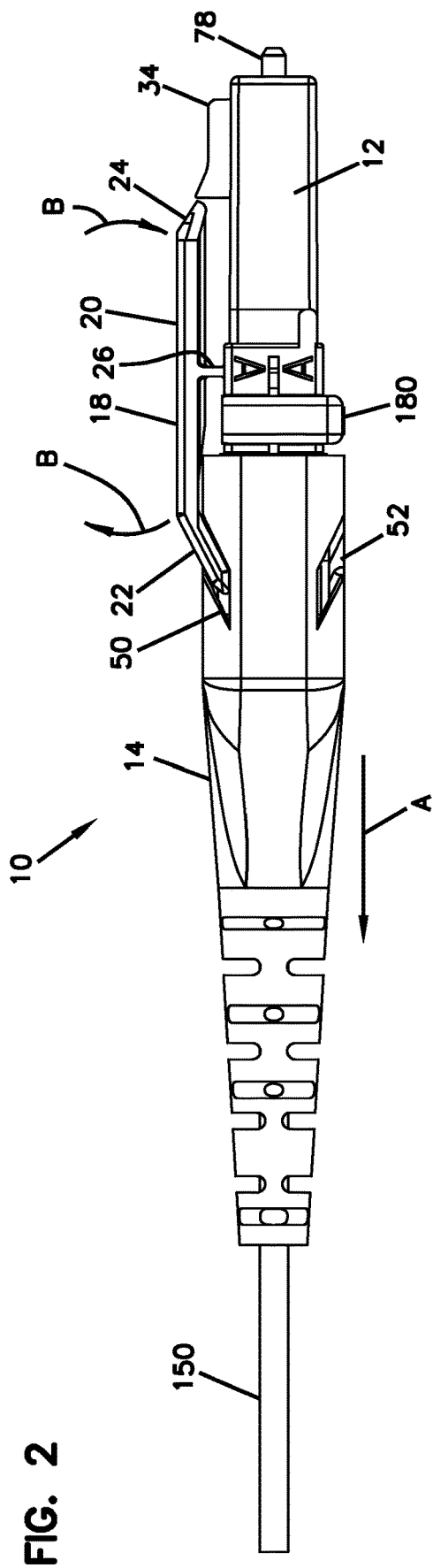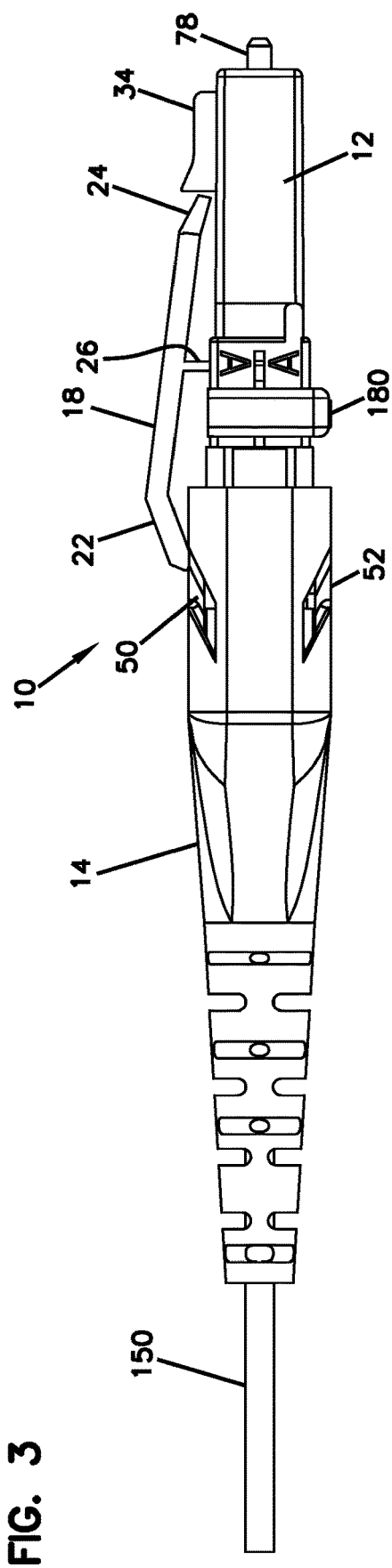
FIG. 2
FIG. 3

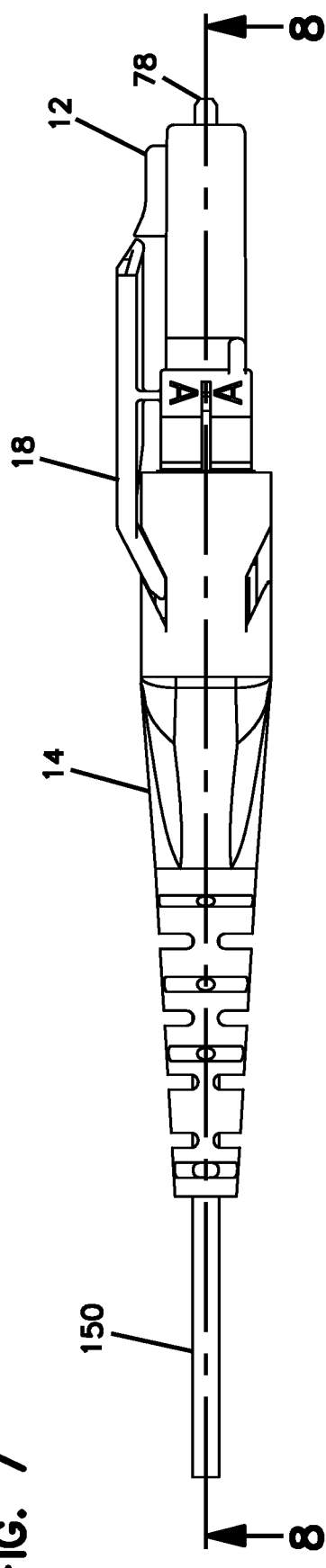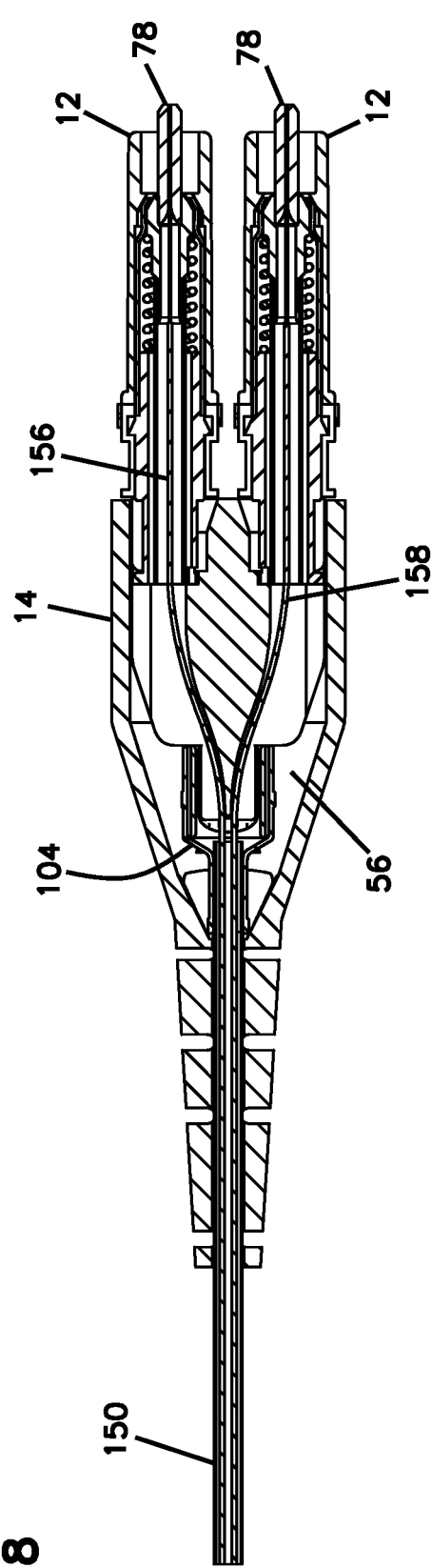
FIG. 7
FIG. 8

FIBER OPTIC CONNECTOR LOCKING FEATURE

CROSS-REFERENCE TO RELATED APPLICATION

This application is a continuation of U.S. patent application Ser. No. 17/037,904, filed Sep. 30, 2020, now U.S. Pat. No. 11,555,966, which is a continuation of U.S. patent application Ser. No. 16/194,918, filed Nov. 19, 2018, now U.S. Pat. No. 10,830,963, which claims priority to U.S. Provisional Patent Application Ser. No. 62/587,774, filed Nov. 17, 2017, entitled FIBER OPTIC CONNECTOR LOCKING FEATURE, the disclosures of which applications are hereby incorporated by reference in their entireties.

TECHNICAL FIELD

The present disclosure relates generally to a fiber optic connector.

BACKGROUND

Modern optical devices and optical communications systems widely use fiber optic cables. A typical fiber optic cable includes one or more optical fibers contained within a protective jacket. Reinforcing structures such as aramid yarns and/or fiber reinforced epoxy rods can be used to provide reinforcement to the optical cables. It is well understood that a typical optical fiber includes a glass fiber processed so that light beams transmitted through the glass fiber are subject to total internal reflection wherein a large fraction of the incident intensity of light directed into the fiber is received at the other end of the fiber. A typical optical fiber includes a glass core surrounded by a cladding layer having a lower refractive index as compared to the refractive index of the core. The cladding causes light to be confined to the core by total internal reflection at the boundary between the two. The cladding layer of an optical fiber is often covered by one or more polymeric coatings (e.g., acrylate) to protect the glass and to facilitate handling of the optical fiber.

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a fusion splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule assembly includes a ferrule that functions to support an end portion of at least one optical fiber (in the case of a multi-fiber ferrule, the ends of multiple fibers are supported). The ferrule has a distal end face at which a polished end of the optical fiber is located. When two optical fibers are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter including an alignment sleeve that receives and coaxially aligns the ferrules of the fiber optic connectors desired to be interconnected. For certain styles of fiber optic connectors, the optical fibers are secured within their respective ferrules by a potting material such as epoxy.

SUMMARY

One aspect of the present disclosure relates to a lock assembly for a connector which includes two connector portions each including a ferrule and a latch, each latch including a distal end and a proximal end. The latch is pivotable about an intermediate connection portion. The connector also includes a boot mounted to the connector portions. The boot is movable longitudinally relative to the connector portions. The boot causes the distal ends of the latch to pivot toward the ferrule of each connector portion as the boot is moved away from the connector portions. The connector also includes a holder with a boot retainer and a boot with a holder mount. The holder releasably holds the connector, and the boot retainer releasably retains the holder mount. The connector, the holder and the boot are releasably connected along a central axis.

An example of the lock assembly releasably locks the holder mount and the boot retainer together in alignment with the central axis. The lock assembly includes a locking axis. In an example, the lock assembly includes a guide and a follower. The guide defines a locking pathway with an insertion section and a rotation section. The insertion section extends in parallel to the central axis. The rotation section extends about the central axis. The follower travels along the locking pathway.

Another example of a lock assembly includes an anti-rotation assembly with a key portion defining a keyway. The key portion can be rotated about an axis, which is normal to the central axis. Rotating the key portion causes the keyway to align with a shoulder. The shoulder can be pivoted into the keyway, inhibiting rotation of the boot about the central axis.

Another example of a lock assembly includes an insertable lock mechanism with a handle and an insert. The handle is accessible by a user to push and pull the handle along an axis, which is normal to the central axis. Pushing the handle causes the insert portion to engage and disengage a corresponding receiver on the holder. The holder can include a receiver. Conversely, a user can pull the handle in order to disengage the insert from the receiver.

In one aspect, the present disclosure relates to a connector assembly that includes a connector portion with a ferrule, a holder comprising a boot retainer, and a boot comprising a holder mount. The holder releasably holds the connector portion. The boot retainer releasably retains the holder mount. The connector portion, the holder and the boot are releasably connected along a central axis. The connector assembly also includes a locking assembly that releasably locks the holder mount and the boot retainer together in alignment with the central axis. The locking assembly includes a locking axis.

In another aspect, the present disclosure relates to a connector assembly that includes a boot retainer and a boot that includes a retainer mount. The boot retainer releasably receives the retainer mount. The boot retainer and the retainer mount are releasably connected along a central axis.

The connector assembly also includes a locking assembly that releasably locks the retainer mount and the boot retainer together in alignment along the central axis. The locking assembly includes a guide and a follower. The guide defines a locking pathway with an insertion section and a rotation section. The insertion section extends in parallel to the central axis. The rotation section extends about the central axis. The follower travels along the locking pathway.

In another aspect, the present disclosure relates to a connector assembly that includes a connector that has a ferrule and a latch. The latch is movable about a connection point. The connector assembly also includes a boot that is removably mounted to the connector. The boot is axially slidable to move the latch. The connector assembly also includes a locking assembly to selectively lock the boot from sliding axially relative to the connector.

BRIEF DESCRIPTION OF THE DRAWINGS

FIG. 2 is a side view of the connector of FIG. 1 shown in the latched position.

FIG. 3 is a side view of the connector of FIG. 1 shown in the unlatched position.

FIG. 7 is a side view of the connector of FIG. 1.

FIG. 8 is a cross-sectional view of the connector of FIG. 7 taken along line 8-8 in FIG. 7.

DESCRIPTION OF EXAMPLE EMBODIMENTS

Figure 23:
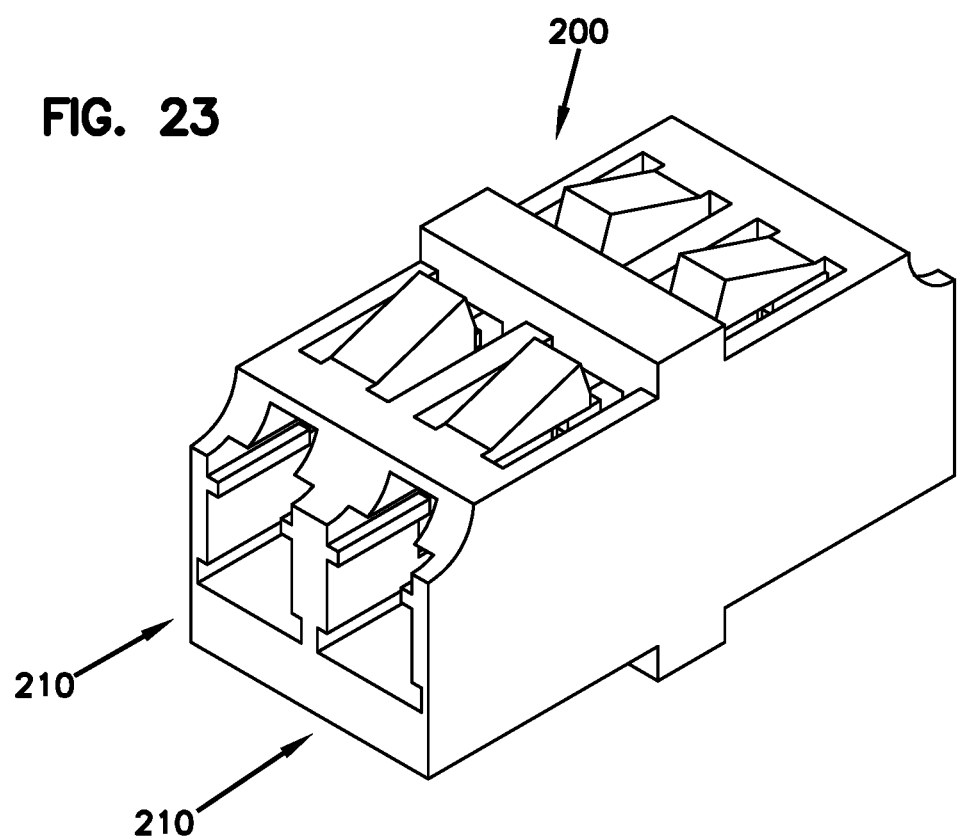
FIG. 23 is a perspective view of a duplex adapter for mating with the connector of FIG. 1.
Figure 24:
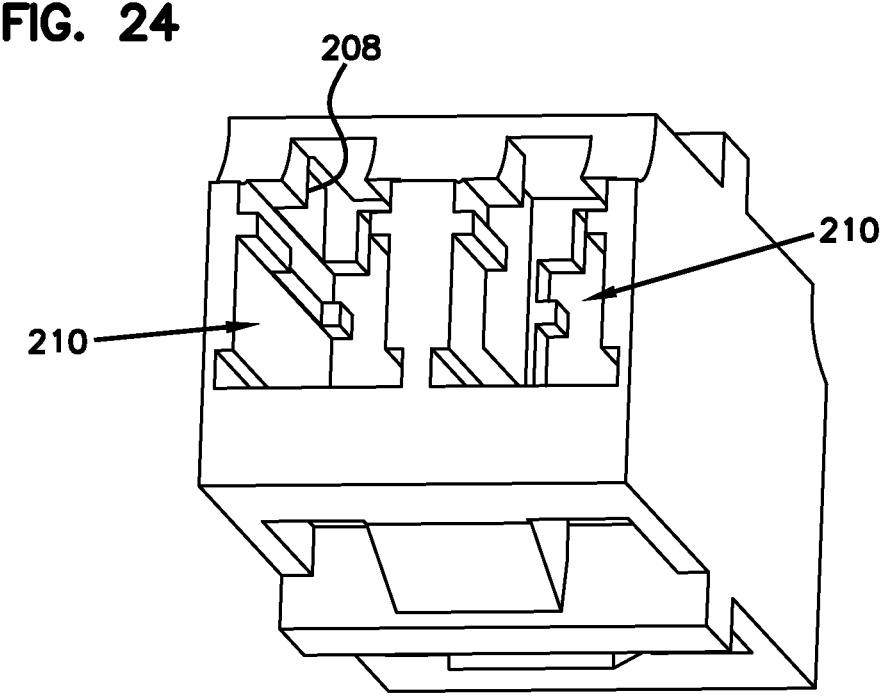
FIG. 24 is a further perspective view of the duplex adapter of FIG. 23.
Figure 25:
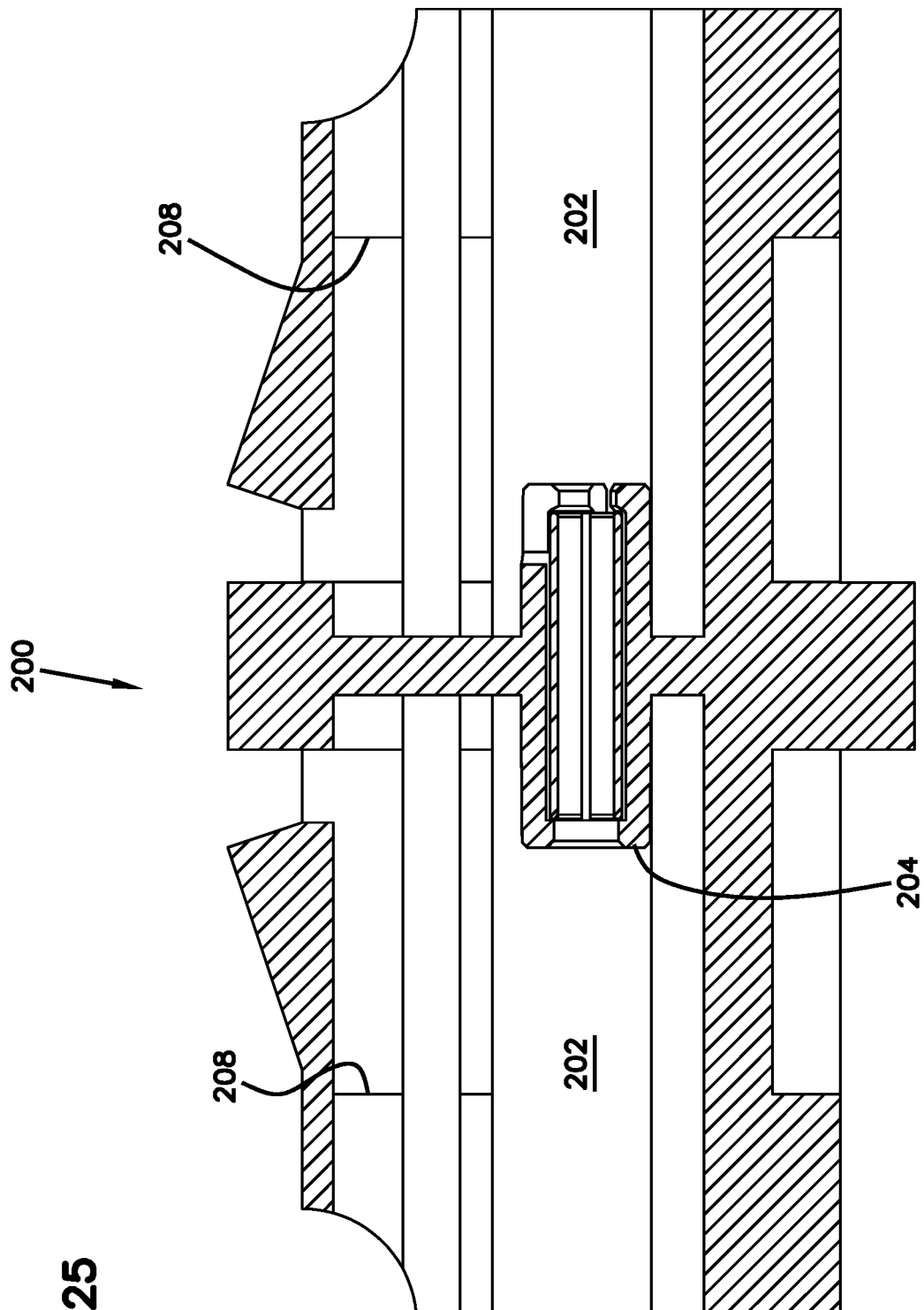
FIG. 25 is a cross-sectional view of the duplex adapter of FIGS. 23 and 24.

Referring now to FIGS. 1-22, an example connector 10 includes two fiber optic connector portions 12 and a boot 14. Connector portions 12 each include a ferrule 78 for holding a fiber optic cable. Connector 10 may also be referred to as a duplex connector assembly or duplex connector. Connector 10 is matable to an adapter 200 shown in FIGS. 23-25. Adapter 200 mates two connectors 10 together or mates another connector to connector 10 for fiber optic signal transmission.

The two connector portions 12 of connector 10 are arranged in a parallel position. Each connector portion 12 has a latch 18 including a latch body 20 with a proximal end 22 and a distal end 24. Latch 18 pivots around a connection point 26 during latching and unlatching of latch 18. Latch 18 secures connector 10 to adapter 200. Boot 14 is movable away from connector portions 12 in a longitudinal direction (Direction A in FIG. 2) causing pivoting movement of latch 18 about connection point 26 (Direction B in FIG. 2). Such pivoting movement allows for unlatching of connector portions 12 from adapter 200. Boot 14 simultaneously moves both latches 18 to allow for connector 10 to be unlatched from a duplex adapter or adapters with side-by-side ports 210. Latch body 20 includes a shoulder 28 which mates with latching shoulder 208 of adapter 200 to secure the connector 10 to the adapter 200.

In the illustrated embodiment, each connector portion 12 defines an LC profile, meaning that the connector portion 12 can mate with an LC adapter.

Boot 14 includes slots 50 which receive distal ends 24 of latch 18. Slots 50 and proximal ends 22 are angled so as to cause a lifting motion for proximal ends 22 which results in a downward movement of distal ends 24 of latch 18 when boot 14 is pulled longitudinally away from a remainder of connector 10. Compare FIGS. 2 and 3. A user can pull on boot 14 in a longitudinal direction away from the ferrules, and remove the connector 10 from the adapter 200, without directly engaging latches 18.

Connector portion 12 includes a front housing 32 and a ferrule assembly 76. Ferrule assembly 76 includes a ferrule 78, a hub 80 which holds the ferrule 78, and a spring 82 which biases hub 80 and ferrule 78 toward front housing 32. A front sleeve 88 and a rear sleeve 90 are mounted together with the ferrule 78, the hub 80, and the spring 82 housed inside to form the ferrule assembly 76. An internal tube 84 is provided extending from the hub 80. Tube 84 prevents epoxy from interfering with the movement of the ferrule 78, the hub 80 and the spring 82. The rear sleeve 90 is received in holder 96 through a side slot 98. A rear crimp ring 104 and a crimp sleeve 106 allow crimping of a cable 150 to holder 96.

Figure 1:
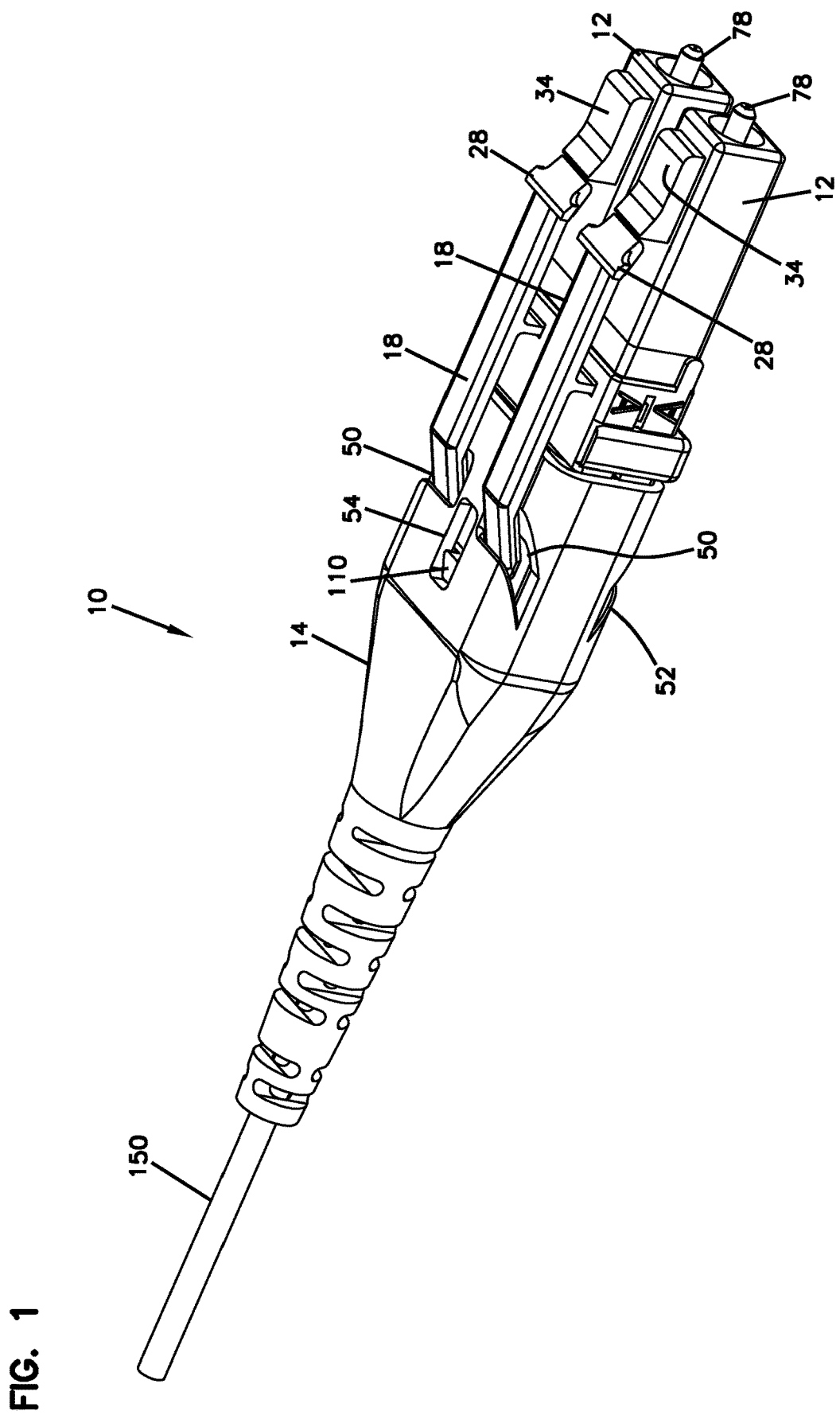
FIG. 1 is a perspective view of one example fiber optic connector in accordance with aspects of the present invention.
Figure 4:
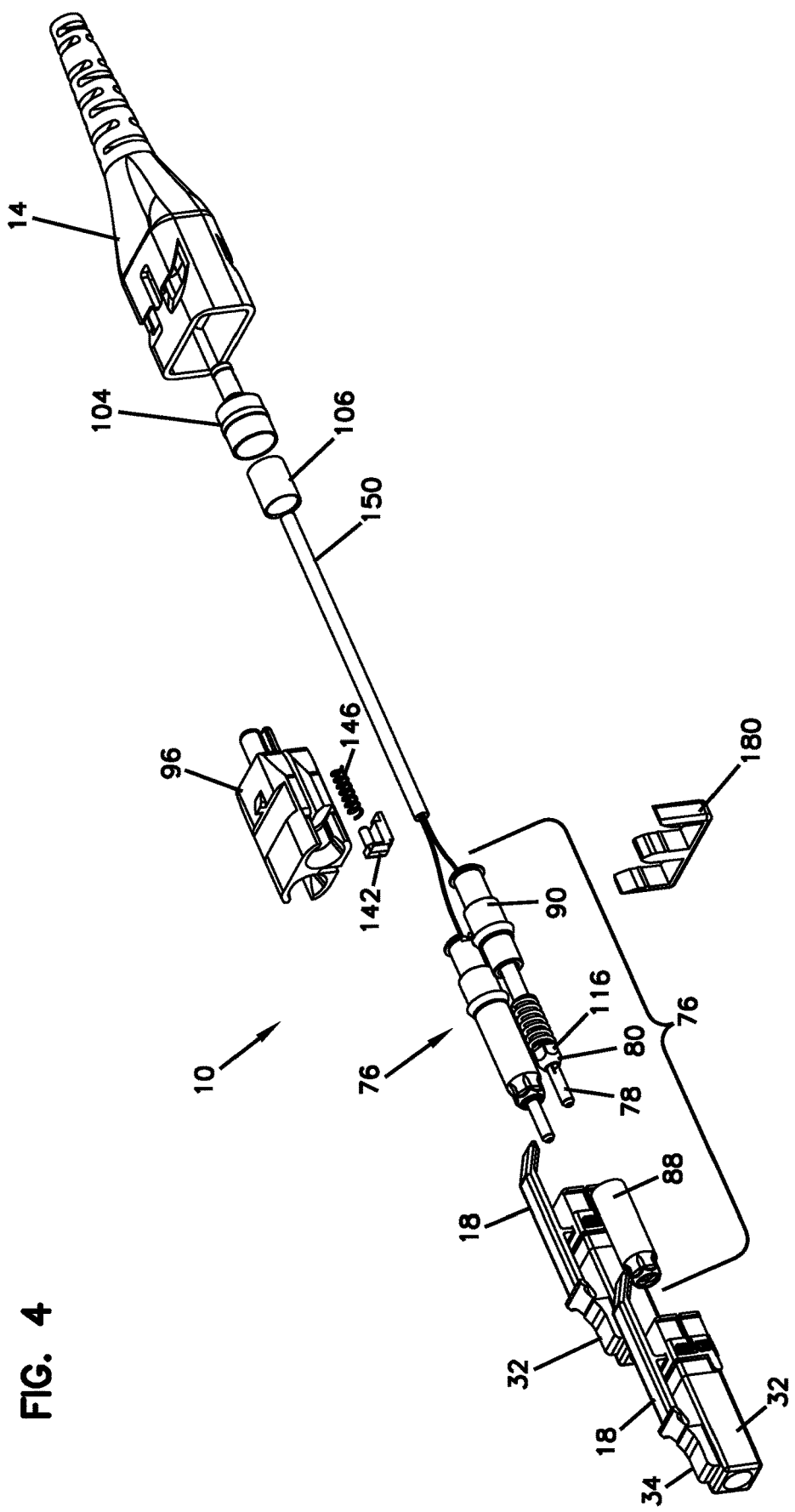
FIG. 4 is an exploded perspective view of the connector of FIG. 1.
Figure 5:
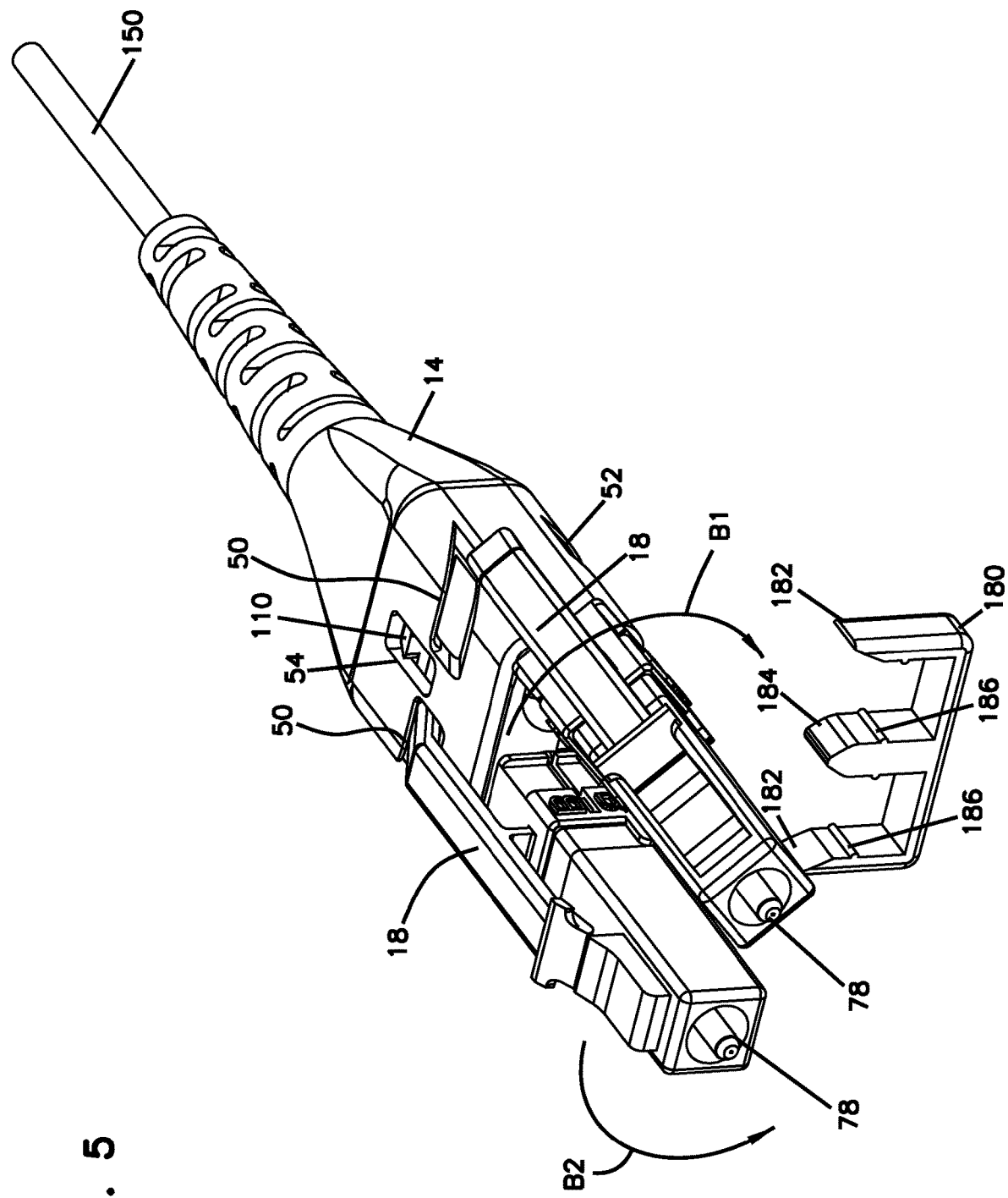
FIG. 5 is a perspective view of the connector, showing the front housings of the connector portions being rotated to change the polarity of the connector.
Figure 6:
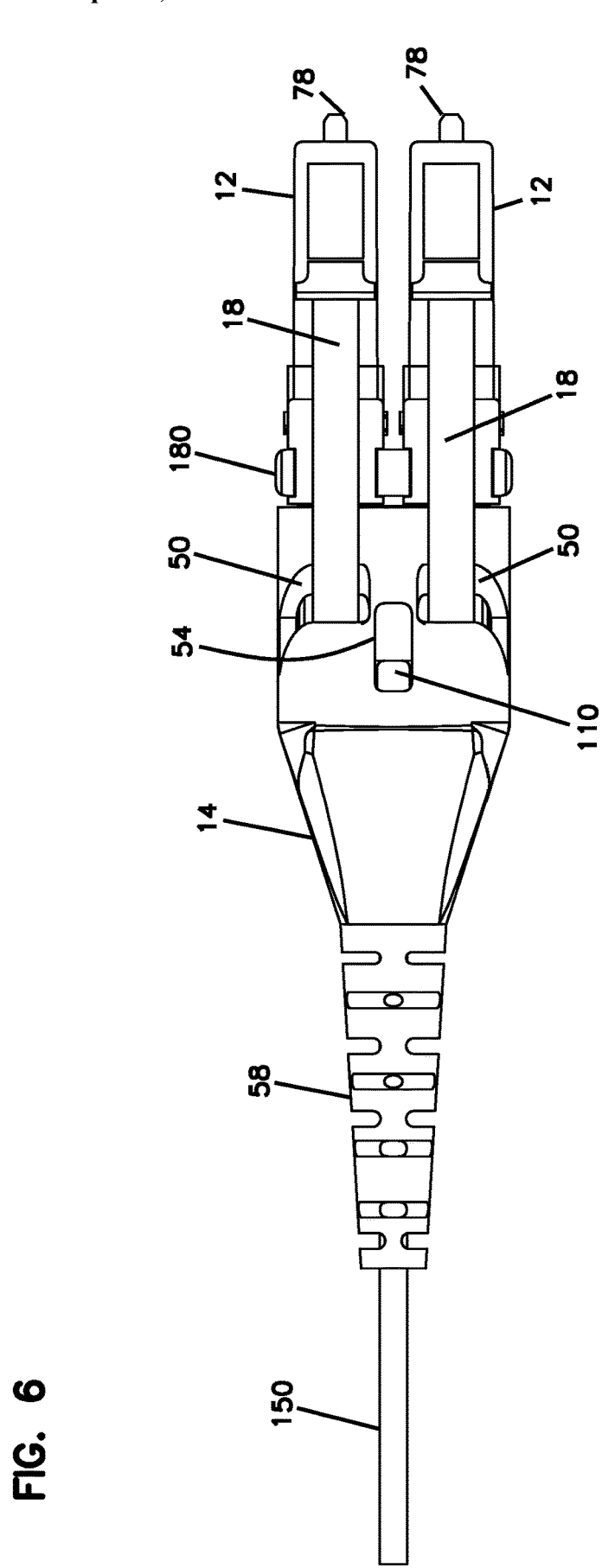
FIG. 6 is a top view of the connector of FIG. 1.
Figure 9:
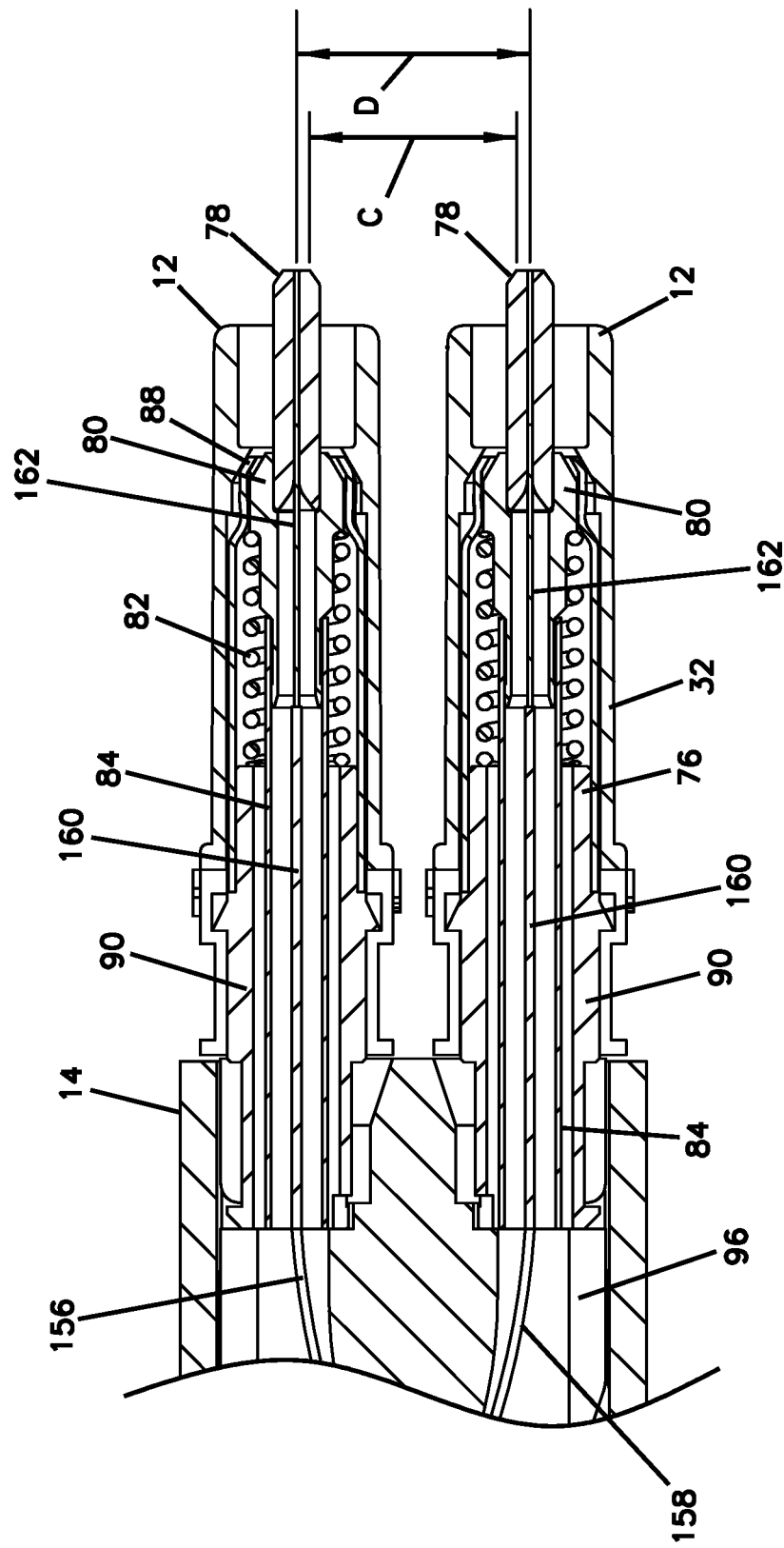
FIG. 9 is an enlarged view of a front portion of the connector of FIG. 8.
Figure 10:
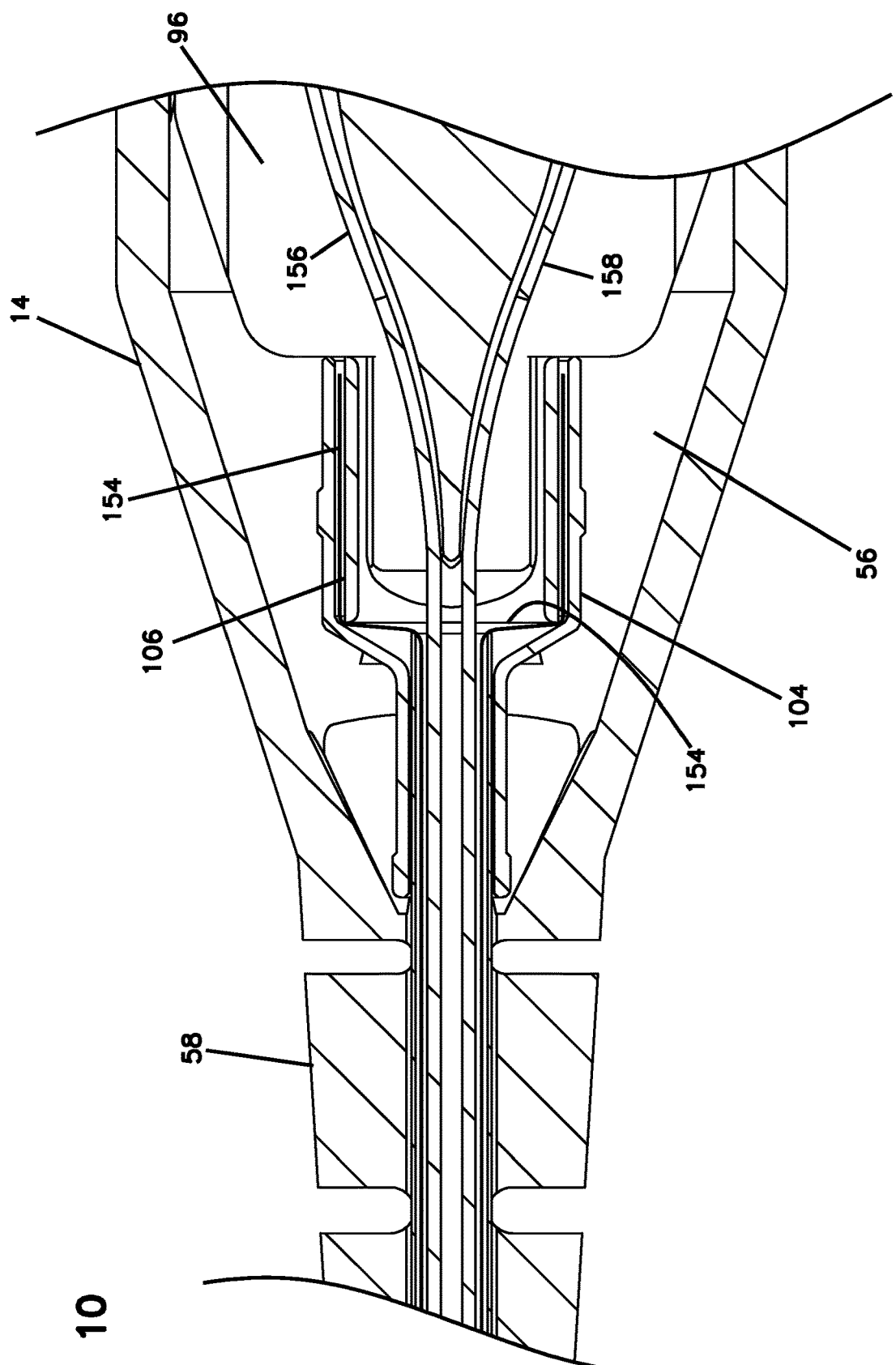
FIG. 10 is an enlarged view of an intermediate portion of the connector of FIG. 8.
Figure 11:
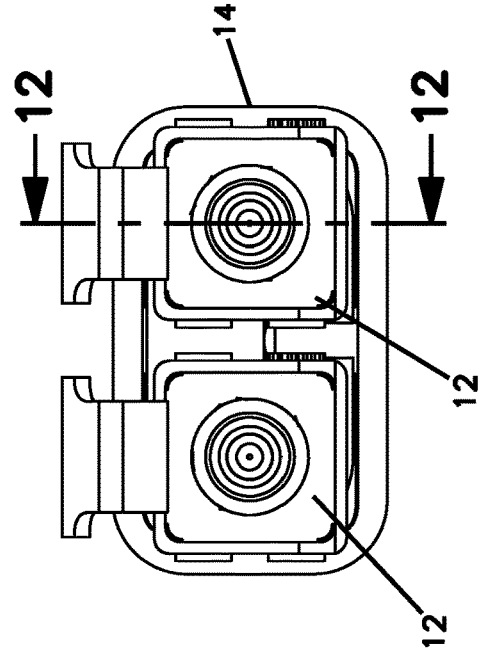
FIG. 11 is an end view of the connector of FIG. 1.
Figure 12:
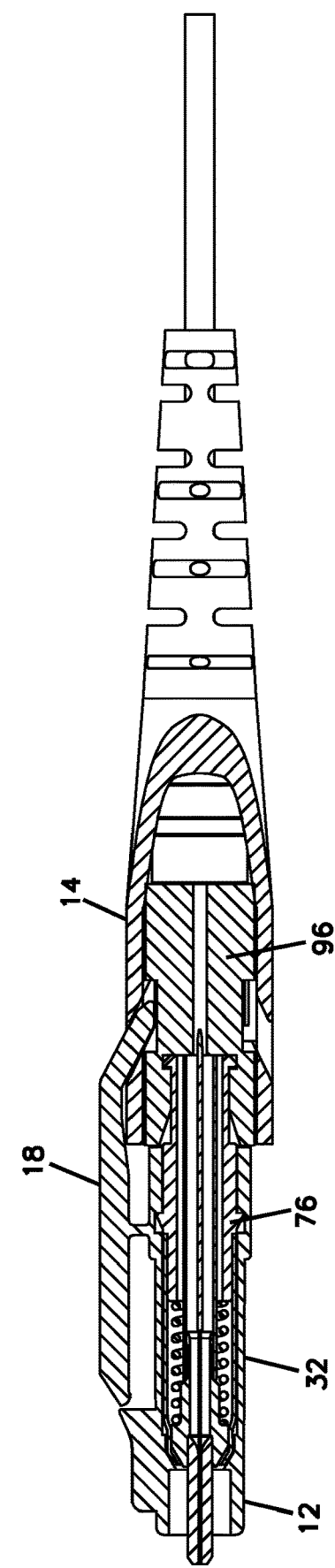
FIG. 12 is a cross-sectional view of the connector of FIG. 11, taken along line 12-12 in FIG. 11.
Figure 13:
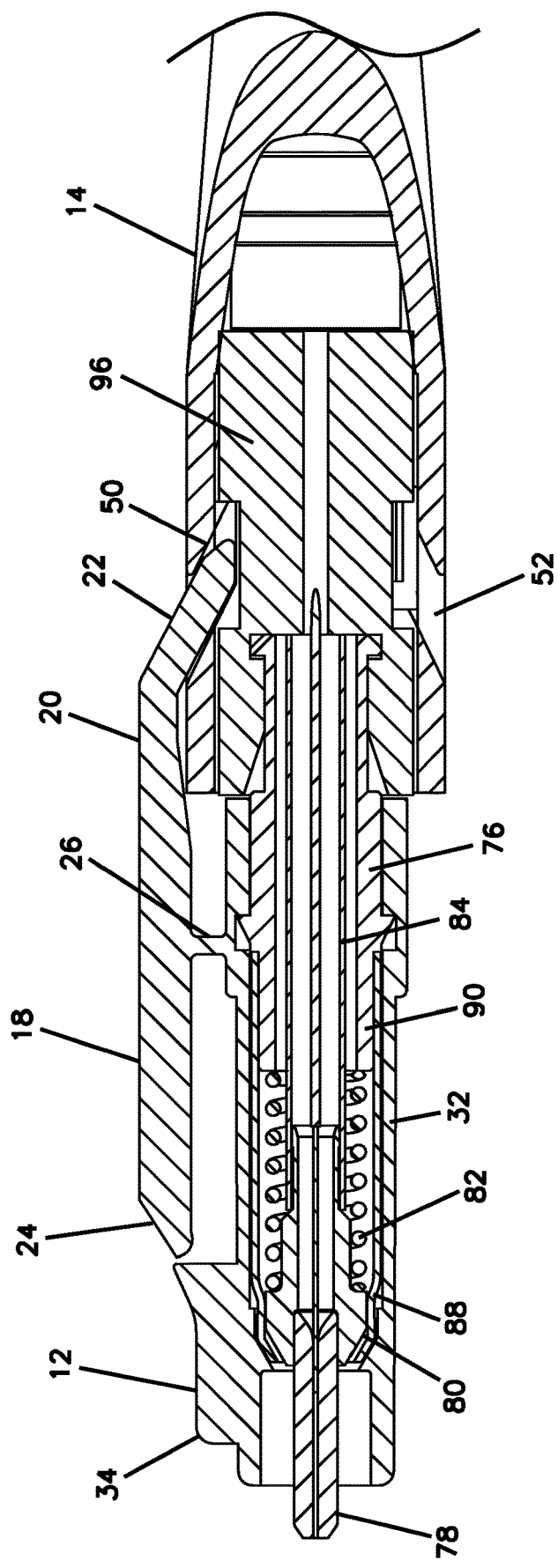
FIG. 13 is an enlarged view of a front portion of the connector of FIG. 12.
Figure 14:
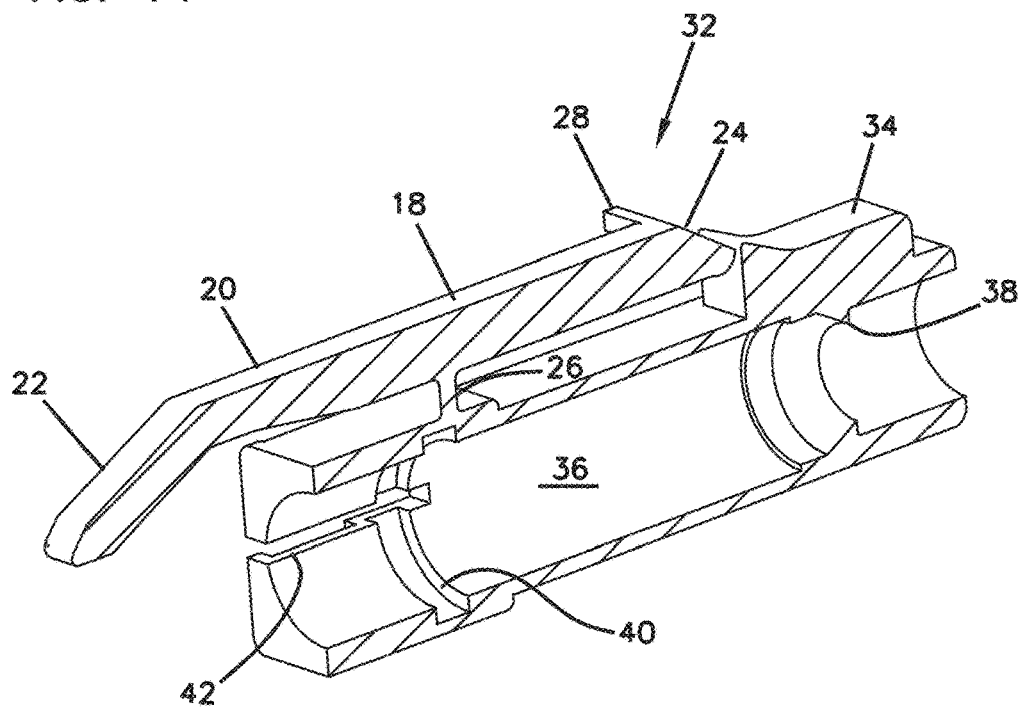
FIG. 14 is a rear perspective view in cross-section of the front housing of one of the connector portions.
Figure 15:
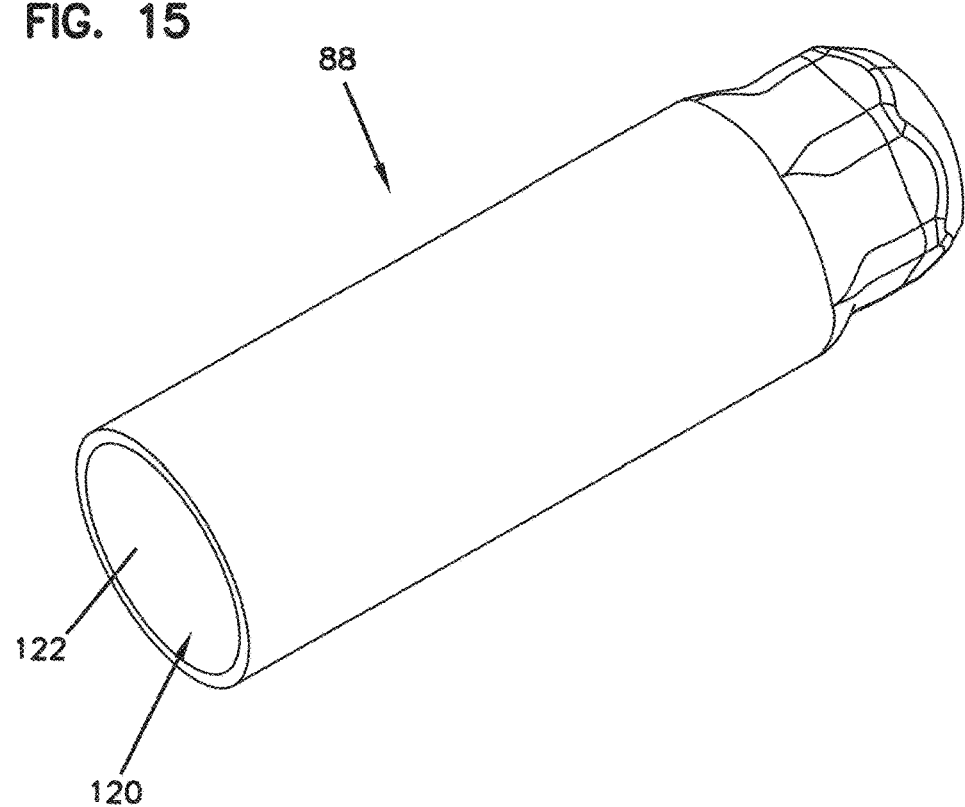
FIG. 15 is a rear perspective view of the front sleeve of one of the ferrule assemblies.
Figure 16:
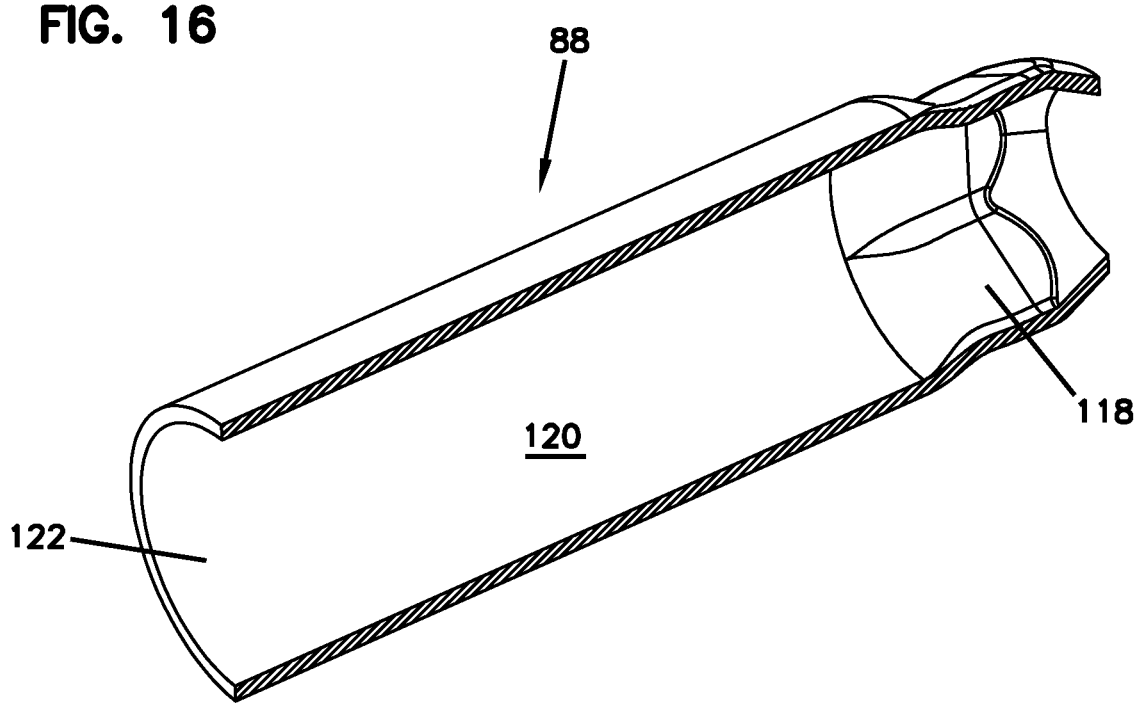
FIG. 16 is a rear perspective view in cross-section of the front sleeve of FIG. 15.
Figure 17:
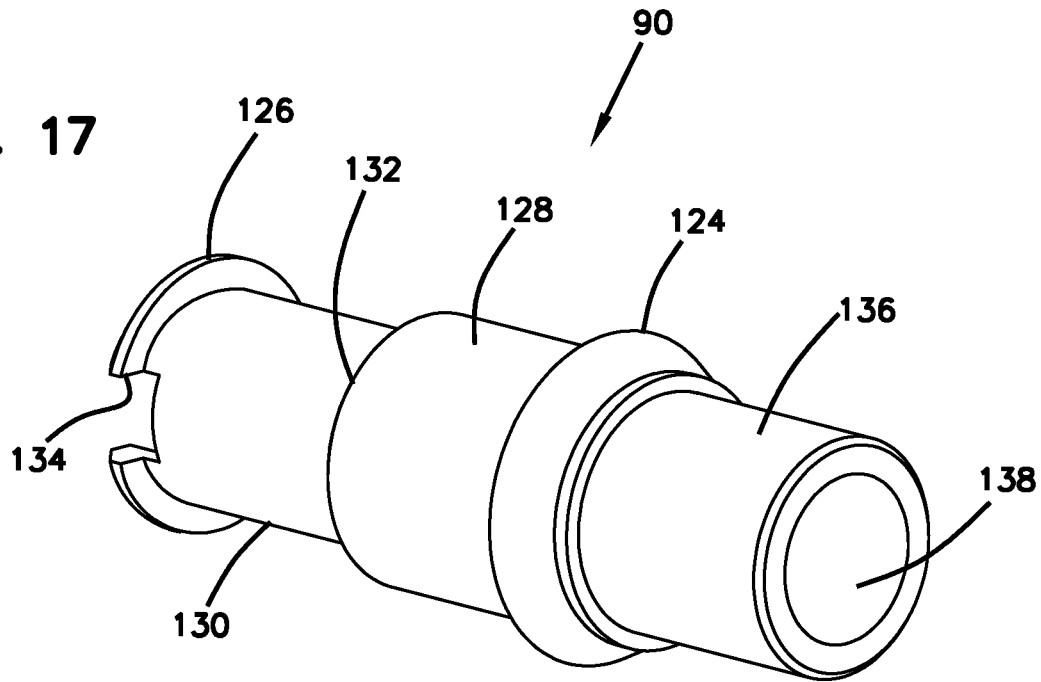
FIG. 17 is a perspective view of the rear sleeve of one of the ferrule assemblies.
Figure 18:
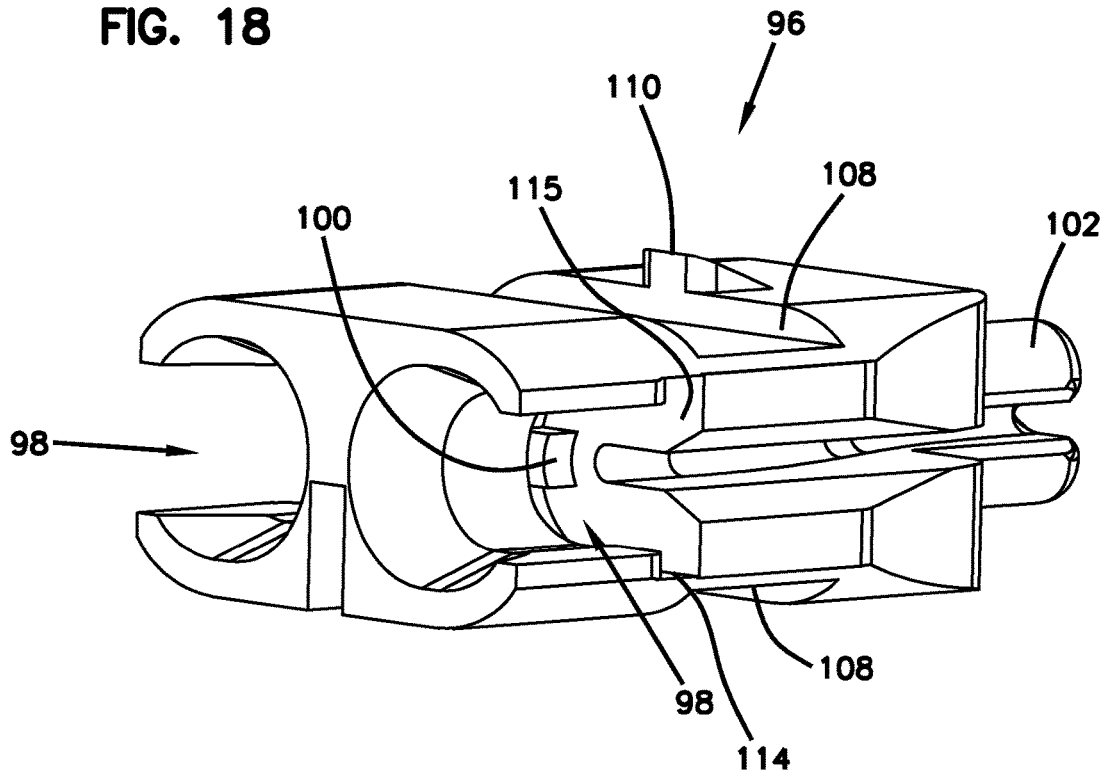
FIG. 18 is a front perspective view of the holder of the connector.
Figure 19:
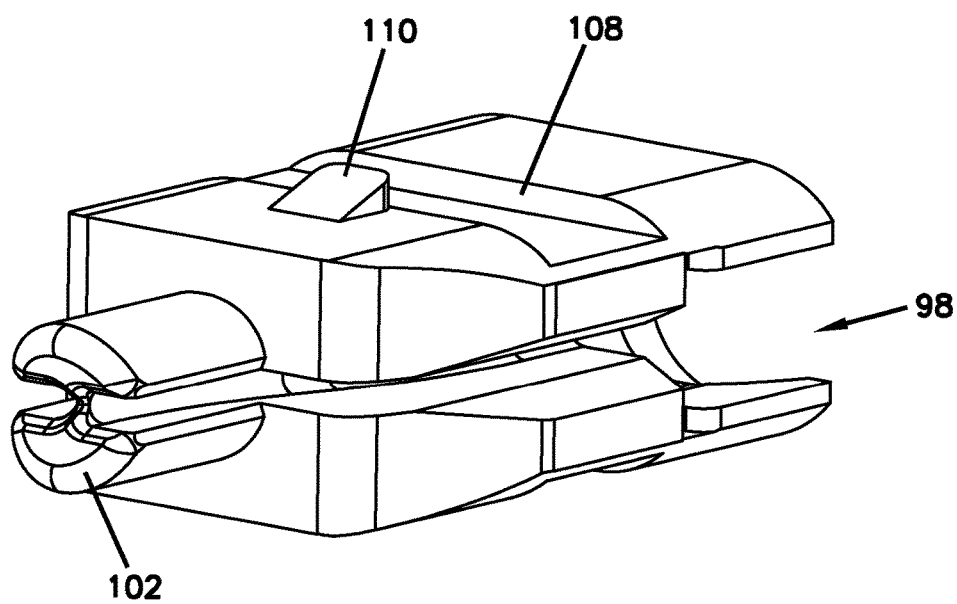
FIG. 19 is a rear perspective view of the holder of the connector.
Figure 20:
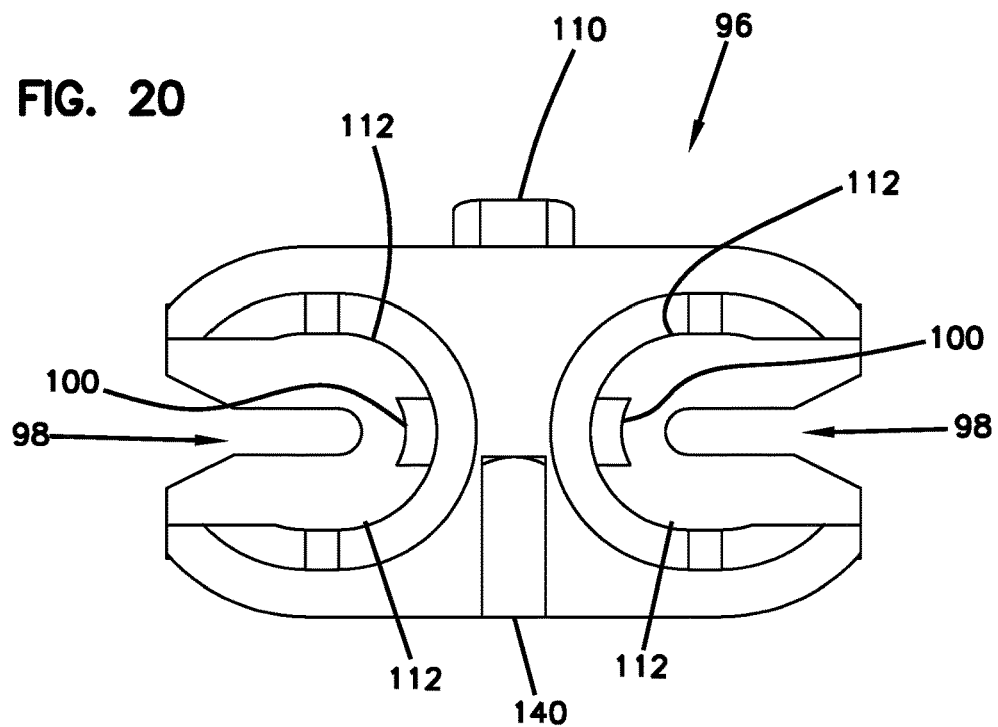
FIG. 20 is a front view of the holder of the connector.
Figure 21:
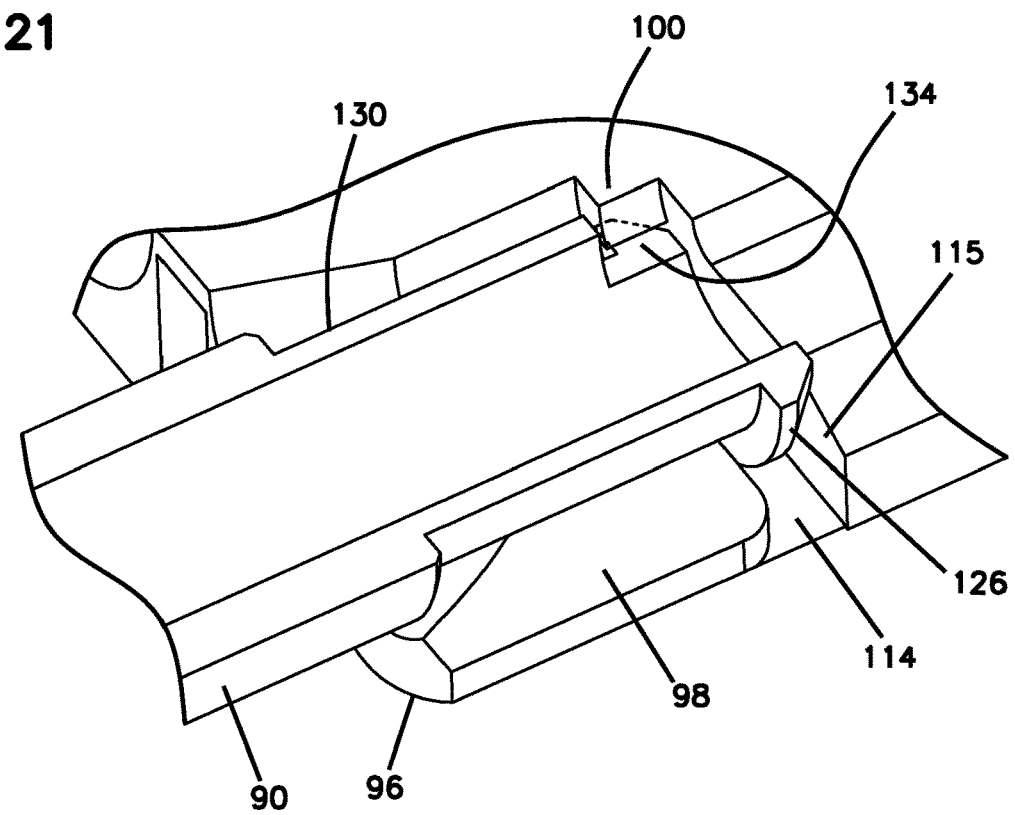
FIG. 21 is front perspective view in cross-section showing one of the rear sleeves mounted to the holder.
Figure 22:
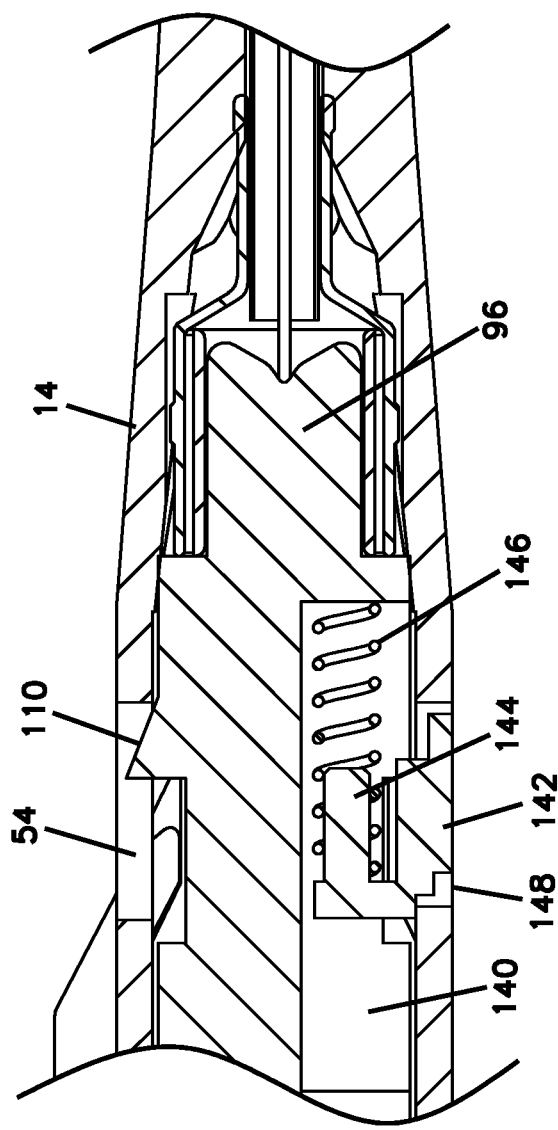
FIG. 22 is a cross-sectional side view of the connector along the centerline.

A clip 180 may be used to hold connector portions 12 in the desired position as shown in FIG. 1. If an alternative position of connectors 12 is desired, such as to reverse the polarity of the connector portions 12, clip 180 is removed, thereby allowing rotation of the front housings 32 with the latches to an opposite side of connector 10. Such operation is desirable to change the polarity of connector portions 12 with respect to boot 14. Once the front housings 32 are rotated (see rotation arrows B1 and B2 in FIG. 5), clip 180 is repositioned to maintain the front housings 32 in the new desired position. Boot 14 includes similar slots 52 on an opposite side of boot 14 so that boot 14 does not need to be rotated. Clip 180 can also be provided with different dimensions so as to change the spacing between connector portions 12, if desired. Clip 180 includes outer arms 182, and an inner arm 184, and shoulders 186 on each of arms 182, 184 for securing to front housings 32 of the connector portions 12.

In the illustrated example, front housing 32 mounts to ferrule assembly 76. Ferrule assembly 76 mounts to holder 96. Holder 96, which mounts to two ferrule assemblies 76, mounts to boot 14. Boot 14 is engageable with latches 18 of the front housings 32. Cable 150 is crimped to holder 96. The individual fibers of cable 150 are fixed to the ferrules 78, such as with epoxy.

Cable 150 includes an outer jacket 152, strength members 154, typically in the form of an aramid yarn, and two fibers 156, 158. Each fiber 156, 158 includes an outer coating 160 and a bare fiber 162. Typically, the coating 160 is removed and the bare fiber 162 is inserted into the ferrule 78, and affixed, such as with epoxy.

Front housing 32 includes a key 34 for mating with an inner passage 202 of adapter 200. Alignment sleeve 204 aligns the ferrules 78 to mate two connectors 10. Adapter 200 includes two ferrule alignment sleeves 204, and side-by-side passages 202 for each receiving a connector portion 12.

Front housing 32 includes latch 18 on an exterior, and an inner passage 36 in the interior for receiving ferrule assembly 76. Inner passage 36 includes a front shoulder 38, an inner slot 40 and a side slot 42.

Boot 14 includes an opening 54 for mating with structure on holder 96. Boot 14 includes an interior area 56, and a flexible rear portion 58.

Holder 96 includes a tab 100 for mating with structure on rear sleeve 90 of ferrule assembly 76. Holder 96 includes a rear projection 102 for receiving the crimp ring 104 and the crimp sleeve 106. Holder 96 includes cross slots 108 for receiving proximal ends 22 of latch 18. A shoulder 110 mates with opening 54 of boot 14 to allow longitudinal movement of boot 14 relative to holder 96. Side slots 98 lead to oval openings 112. Oval openings 112 allow for lateral movement of connector portions 12 to vary the lateral spacing. Oval openings 112 clip over ferrule assemblies 76 to retain the assemblies with holder 96.

Holder 96 is provided with a lateral slot 114, and a rear stop 115 for mating with rear sleeve 90 of each ferrule assembly 76.

Front sleeve 88 of ferrule assembly 76 includes a keyed surface 118 for mating with a keyed surface 116 of hub 80.

Inner surface 122 of front sleeve 88 is press fit onto outer surface 136 of rear sleeve 90. Rear sleeve 138 defines an inner passage 138.

Rear sleeve 90 includes a front collar 124 received in inner slot 40 of front housing 32. Rear collar 126 of rear sleeve 90 is received in slot 114 of holder 96. Outer surface 128 of rear sleeve 90 includes a reduced diameter portion 130, and a shoulder 132. Reduced diameter portion 130 is received in oval opening 112. Oval opening 112 retains rear sleeve as the side slot 98 is slightly smaller than reduced diameter portion 130. Notch 134 of rear sleeve 90 receives tab 100 of holder 96. Rear sleeve 90 and the rest of ferrule assembly 76 is prevented from rotating relative to holder 96.

To assemble connector 10, cable 150 is inserted through boot 14, crimp ring 104 and crimp sleeve 106. The fibers 156, 158 are affixed to the ferrules 78 of the ferrule assemblies 76. The ferrule assemblies 76 with the front housings 32 attached are mounted to the holder 96. The cable jacket 152 and strength members 154 are crimped to rear projection 106 between crimp ring 104 and crimp sleeve 106, although crimp sleeve 106 is optional is some implementations. Boot 14 is pulled over holder 96 until shoulder 110 of holder 96 is retained in opening 54 of boot 14, and proximal ends 22 of the latches 18 are in one of slots 50, 52 of boot 14.

To switch polarity of connector portions 12, the front housings 32 are rotated in opposite directions so that the proximal ends 22 of the latches 18 are moved between slots 50, 52. During polarity switching, boot 14 remains mounted to housing 96. Clip 180 is removed during the polarity switching operation.

Front housings 32 with latches 18 can each be made as a one-piece element. Front housing 32 defines an LC profile for mating with ports 210 of adapter 200. As noted, front housings 32 are rotatable about the longitudinal axis of each connector portion 12 to change the polarity of the connector 10, without rotating the ferrule 78 or the ferrule assembly 76.

While the example connector 10 includes two fiber optic connector portions 12 and a boot 14, it is to be appreciated that connector 10 can include a single connector portion 12.

In some examples, clip 180 is not used. Clip 180 can be used to provide a certain spacing of connector portions 12. One spacing is sized at 6.25 millimeters. See Dimension D of FIG. 9. Another spacing that may be used is 5.25 millimeters. See Dimension C of FIG. 9. A different clip 180 with a different spacing may be used, or the clip may be not used for the closer spacing.

Boot 14 is shown as including a spring return feature. Pocket 140 of holder 96 receives a spring holder 142 including a peg 144. Spring holder 142 with peg 144 holds a return spring 146. Spring 146 biases boot 14 toward the forward position of FIG. 2 when released by the user. When the user pulls boot 14 longitudinally away from the connector portions 12, the spring 146 is compressed. Spring 146 moves the boot 14 back to the rest position of FIG. 2 upon release by the user. Pocket 140 of holder 96 is accessible through opening 148.

Locking Assemblies

Referring now to FIGS. 26-30, another example connector 300 includes two fiber optic connector portions 312 and a boot 314, each structurally and functionally similar to the embodiment (12, 14) described above. The connector 300 also includes latches 318 structurally and functionally similar to the embodiment (18) described above. The connector 300 also includes a locking assembly to maintain the position of the boot 314 with respect to the fiber-optic connector portions 312 and the latches 318.

The illustrated boot 314 has a cable support portion 320 and a cover portion 322. The cable support portion 320 supports a cable structurally and functionally similar to the embodiment described above. The cover portion 322 engages the latches 318 structurally and functionally similar to the embodiment described above.

The locking assembly can include an axial translation assembly 340 (see FIG. 29) to define the range of movement of the boot 314 along a central axis X. The lock assembly can also include a rotational restriction assembly 342 (see FIGS. 26-27) to restrict the range of movement of the boot 314 about the central axis X.

Figure 30:
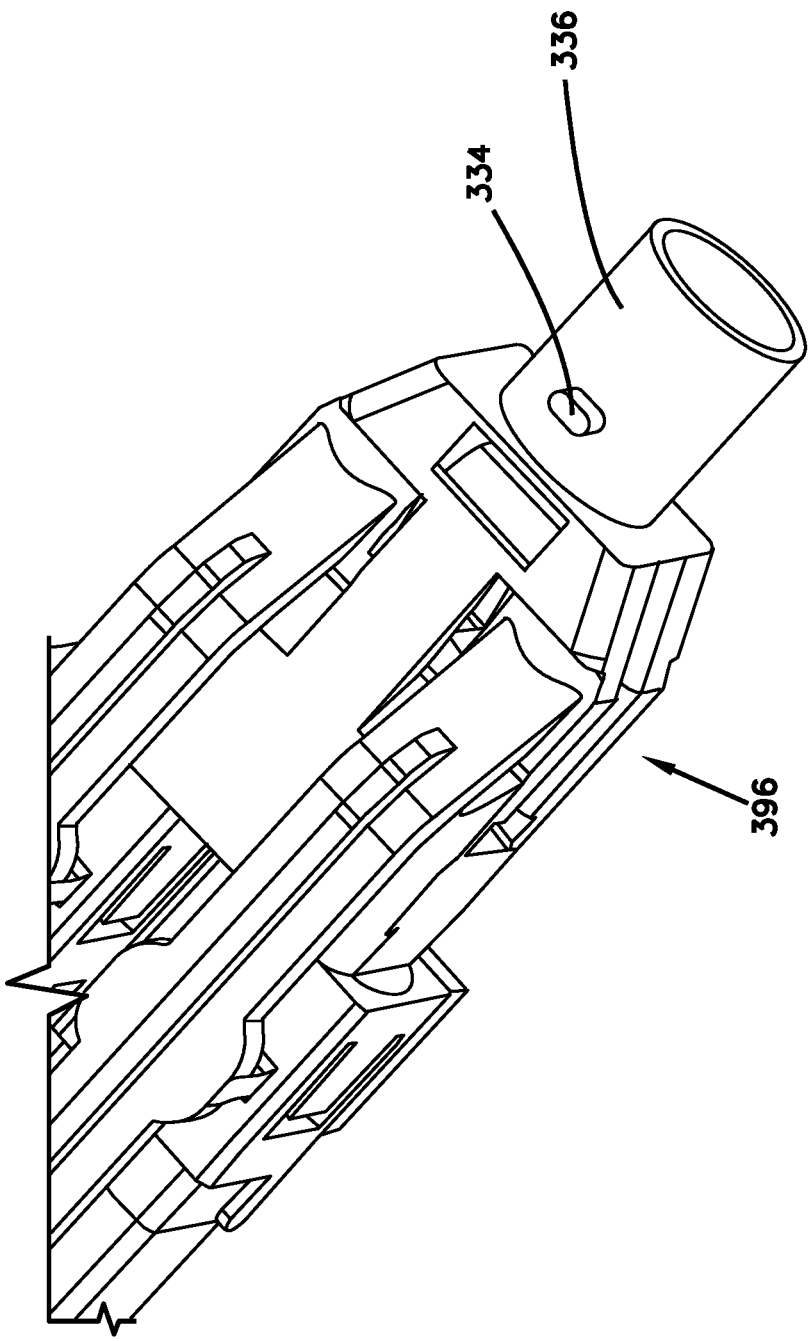
FIG. 30 is a perspective view of the fiber optic connector shown in FIG. 26, showing the cover and the boot removed.

The axial translation assembly 340 can include a guide 328 and follower 334 assembly on the boot 314 and a boot receiver 336, respectively. Referring to FIG. 30 in particular, a holder 396, that is structurally and functionally similar to the holder (96) described in the embodiment above, supports the boot receiver 336. Preferably, the boot receiver 336 is rigidly supported by the holder 396 without any relative rotation or axial separation therebetween. The boot receiver 336 can have a cylindrical geometry with an internal passageway to receive a crimp ring and crimp sleeve, as similarly described in the embodiment (104, 106) above. The boot receiver 336 includes a follower 334, for example a protrusion, extending radially away from the outer circumference.

Figure 28:
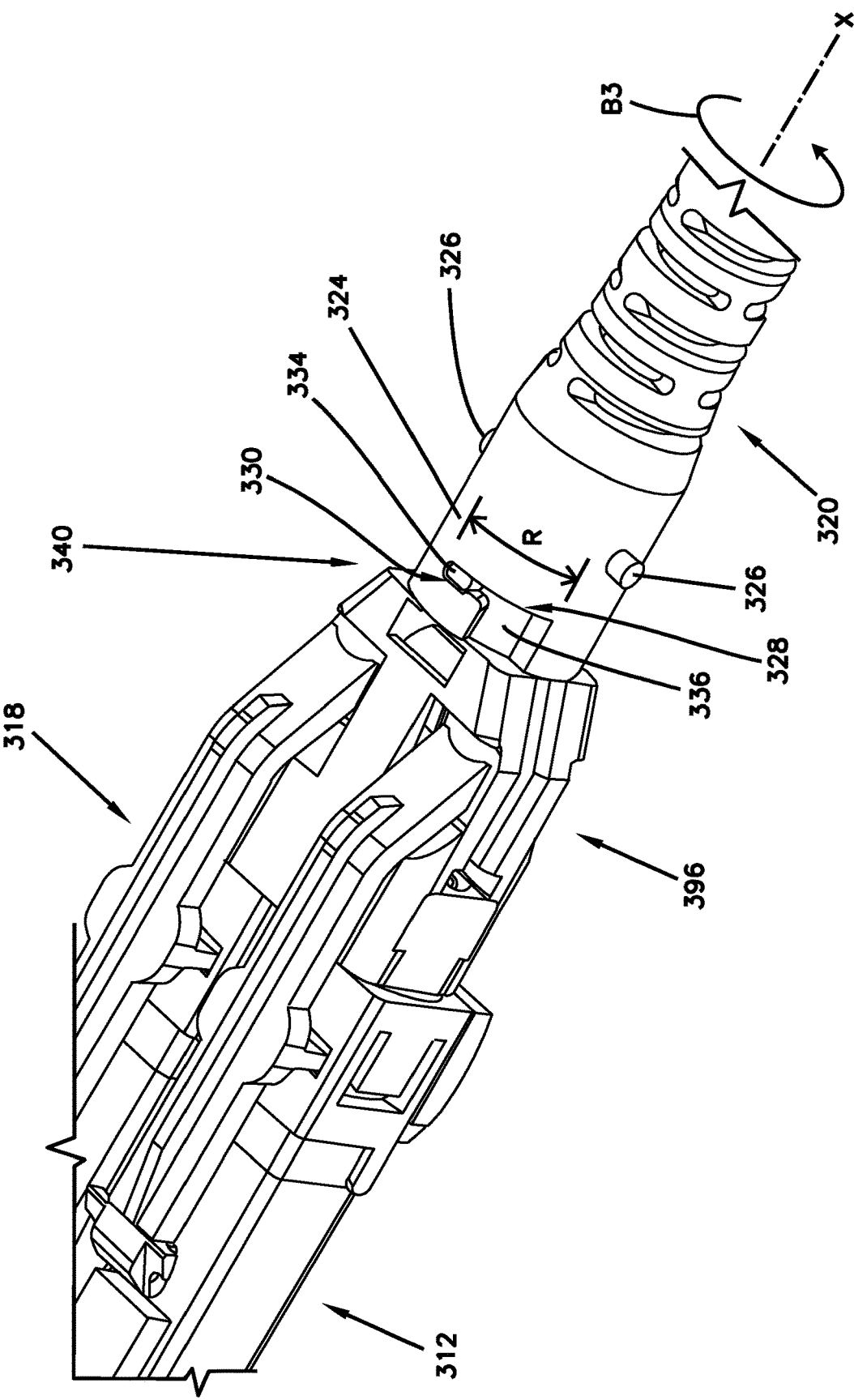
FIG. 28 is a perspective view of the fiber optic connector shown in FIG. 26, showing the fiber optic connector in the locked position with the cover removed.
Figure 29:
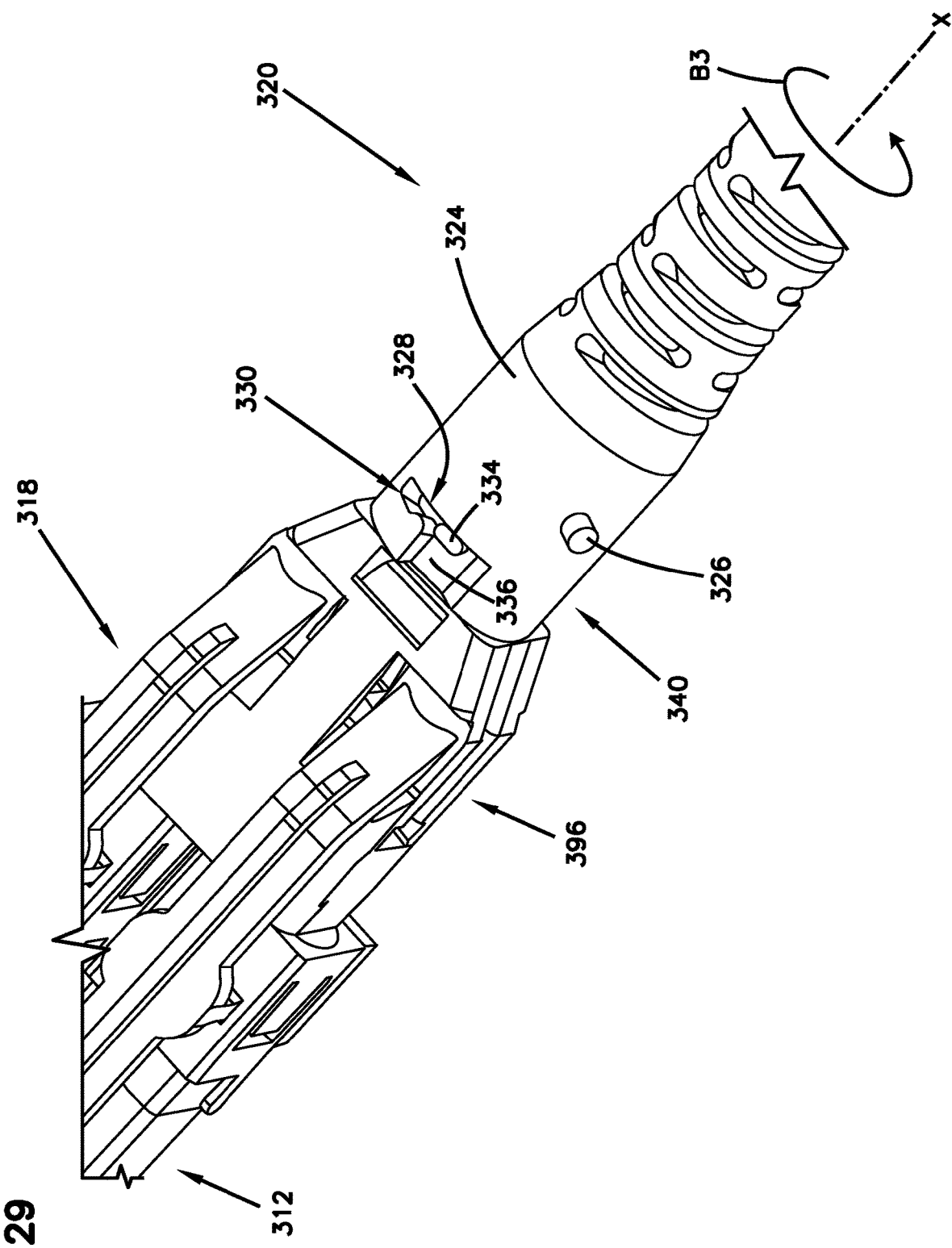
FIG. 29 is a perspective view of the fiber optic connector shown in FIG. 26, showing the fiber optic connector in the unlocked position with the cover removed.

Referring to FIGS. 28-29 in particular, the rear boot portion 320 includes a holder mount 324 that can be fitted over the boot receiver 336 such that the boot receiver is received within the holder mount. Preferably, the holder mount 324 is rigidly supported by the rear boot portion 320 without any relative rotation or axial separation therebetween. The holder mount 324 can be a collar with a geometry generally like a cylinder having a hollow inner passageway to receive the boot receiver 336 therein.

The holder mount 324 includes the guide 328, for example a cam, channel or cutout, into which the follower 334 on the boot receiver 336 is inserted. The illustrated guide 328 has an open receiving end (or mouth) at the distal mounting end of the holder mount 324, and can have a closed catch end 330. The guide 328 can have an L-shaped pathway with a first axial section and a second rotational section. The first axial section can extend in parallel to axis X and the second rotational section can extend rotationally away from axis X. The guide 328 terminates at the closed catch end 330.

In use, as the holder mount 324 is fitted over the boot receiver 336 the follower 334 enters the guide 328 and travels along the first axial section to a terminal end away from the receiving end. When the follower 334 reaches the terminal end of the first axial section of the guide 328, the holder mount 324 is rotated about the axis X (see rotation arrow B3 in FIGS. 28 and 29) around and with respect to the boot receiver 336. During this rotation, the follower 334 travels along the second rotational section of the guide 328 toward the closed catch end 330.

As illustrated, the length R of the rotation section can include the catch end 330 and a narrowed section defined by an obstacle, for example a bump or projection which narrows the second rotational axis between the catch end and the receiving end. The catch end 330 can be separated from the first axial section of the guide 328 by the narrowed section. Preferably, the width of the narrowed section (defined in parallel to the central axis X) is slightly narrower than the width of the follower 334. As a result, an amount of additional force is applied to rotate the follower 334 past the narrowed section into the catch end 330. Similarly, without the additional amount of force, the follower 334 cannot be rotatably removed out of the catch end 330.

Alternatively, or additionally, to the narrowed section being narrower than the width of the follower 334, the connector 300 can include a spring similar to the spring (146) in the embodiment above which biases the boot 314 away from the holder 396. With such a spring, when the follower 334 is in the catch end 330 the spring biases the holder mount 324 away from the boot retainer 336, such that the follower 334 contacts the distal edge of the catch end. Without an application of force to push the cable support section 320 against the spring bias, the follower 334 cannot freely bypass the obstruction of the narrowed section, so cannot freely exit the catch end 330.

The locking assembly can also include the rotational restriction assembly 342 to restrict the range of rotation of the boot 314 about the central axis X, specifically restricting the range of rotation of the cable support section 320 within the cover section 322. The rotational restriction assembly 342 can include a pair of guides 344 (see FIGS. 26-27) positioned oppositely from each other on the cover section 322 of the cable 314. The guides 344 (the opposite guide is not shown) can be lengths of channels cut out from the cover section 322. The guides 344 can be oriented along a rotational axis about axis X.

The rotational restriction assembly 342 can also include a pair of followers 326 (see FIGS. 26-29), for example protrusions or projections. The followers 326 are positioned oppositely from each other on the holder mount 324 of the cable support section 320 of the cable 314. As illustrated, the pair of followers 326 extend through the guides 344 on the cover section 322. The outer diameter of the holder mount 324 is slightly smaller than the inner diameter of the cover section 322, such that there is a degree of rotation provided between the holder mount and the cover section.

Figure 26:
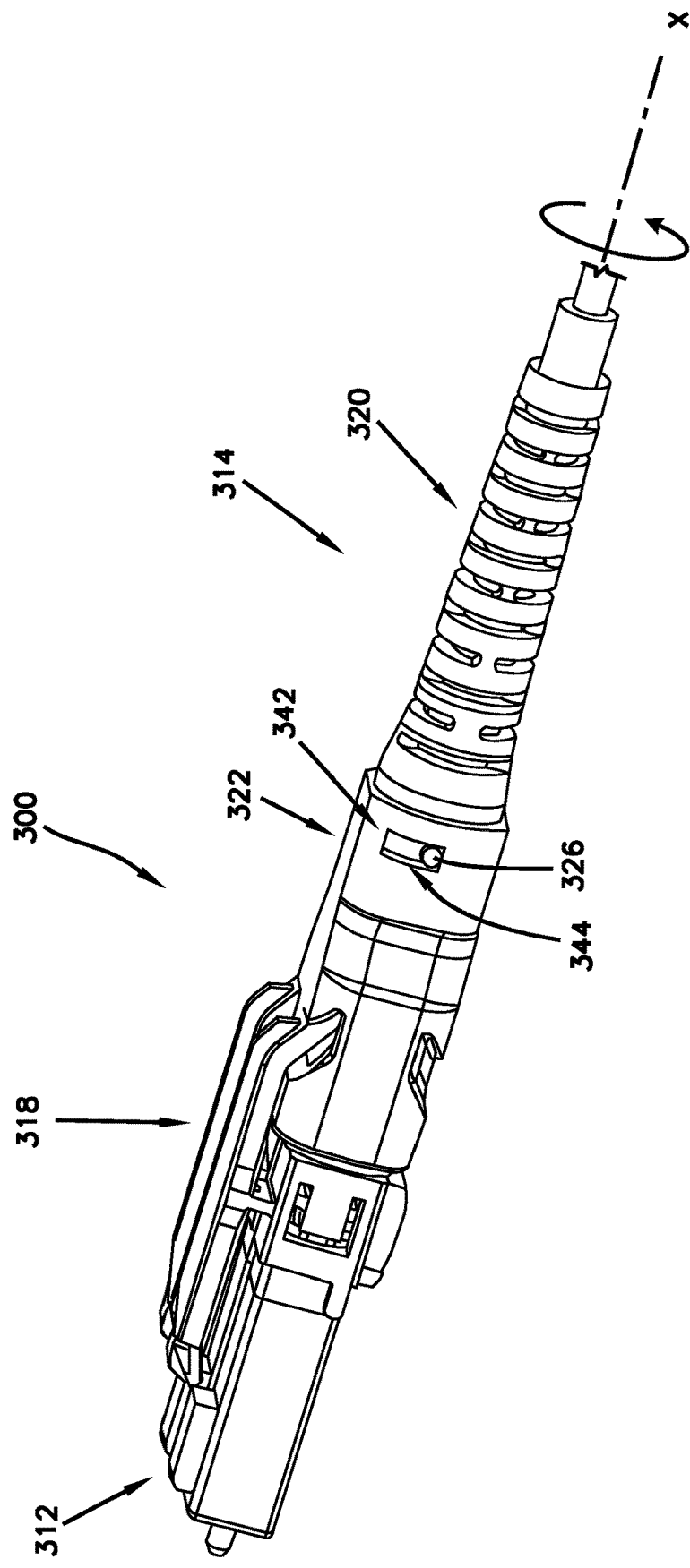
FIG. 26 is a perspective view of another example fiber optic connector in accordance with aspects of the present invention, showing the fiber optic connector in an unlocked position.
Figure 27:
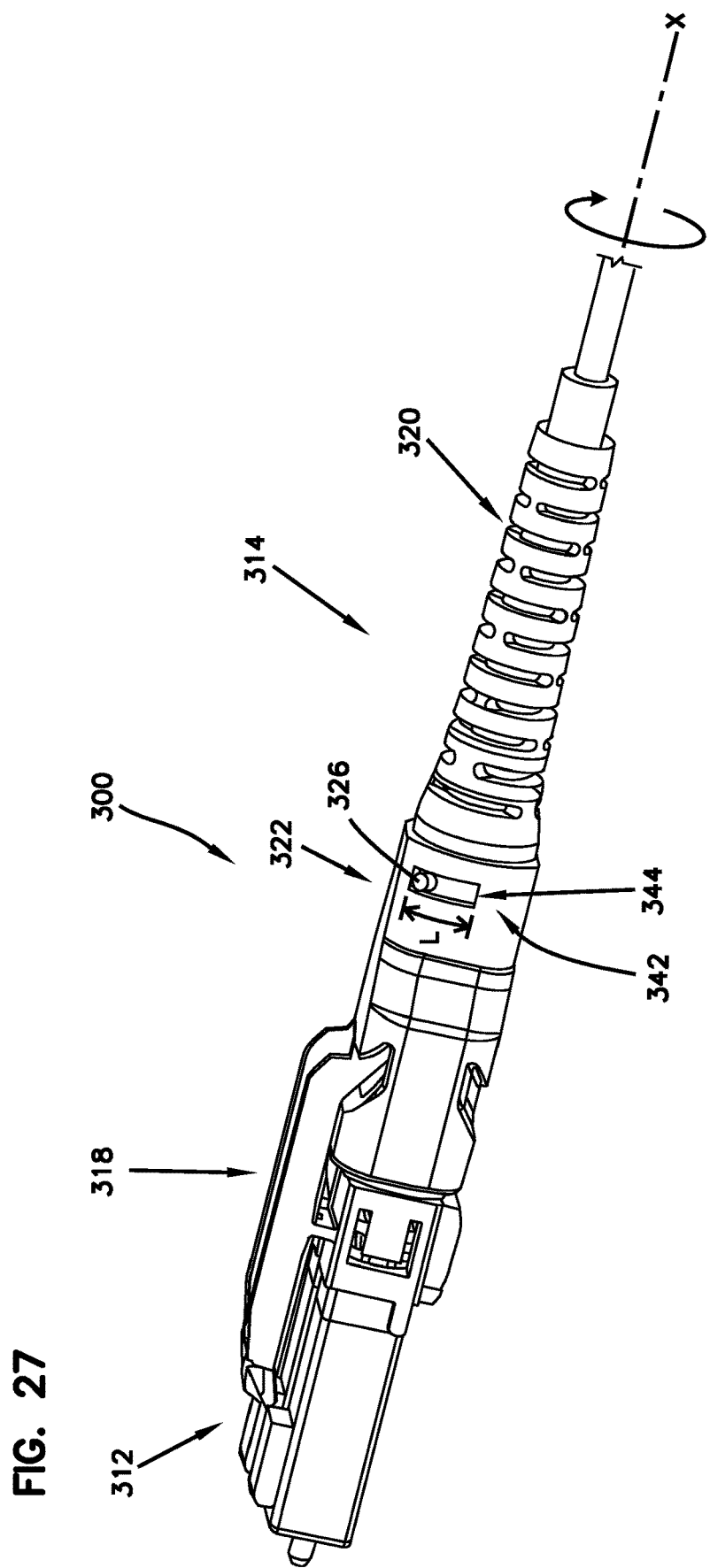
FIG. 27 is a perspective view of the fiber optic connector shown in FIG. 26, showing the fiber optic connector in a locked position.

During rotation of the cable support section 320 about the central axis X, as shown in FIGS. 26-27, the followers 326 travel along the length L of the guides 344. Preferably, the length L of the guides 344 is generally equal to the length R of the rotational section of the guide 328 in the axial translation assembly 340. As a result, the range of rotation R of the holder mount 324 about the boot receiver 336 is generally equal to the range of rotation L of the cable support section 320 within the cover section 322.

In use, the cover section 322 is pre-assembled over the cable support section 320 such that the followers 326 cannot be removed from within the guides 344. The cover section 322 is fitted onto the holder 396, thus receiving the latches 318 similarly to the embodiments described above. In conjunction, the holder mount 324 is fitted over the boot retainer 336, with the follower 334 being inserted into the axial section of the guide 328. When the cover section 322 is fully fitted onto the holder 396, such that the latches 318 are correspondingly secured, the follower 334 on the boot retainer 336 is also pushed to the terminal end of the axial section of the guide 328.

The cable support section 320 is then rotated about axis X with respect to the cover section 322, such that the follower 334 on the boot retainer 336 travels along the rotational section of the guide 328 past the narrow obstruction section toward the catch end 330. As described above, an additional amount of force is applied to rotate the follower 334 past the narrowed obstruction section of the guide 328 and into the catch end 330. Alternatively, or additionally, to the narrowed obstruction section, as described above, when the follower 334 enters the catch end 330 the spring biases the holder mount 324 into a position whereby the follower does not freely bypass the narrowed obstruction section. When the follower 334 is positioned within the catch end 330 of the guide 328, any unintended rotation of the holder mount 324 in the opposite direction with respect to the boot retainer 336 is inhibited without additional force.

An alternative benefit of the rotational restriction assembly 342 is that it provides an indication of whether the follower 334 on the boot retainer 336 is locked within the catch end 330 of the guide 328. Specifically, rotation of the cable support section 320 simultaneously causes the follower 334 to travel along the rotational section of the guide 328 and causes the followers 326 to travel along the guides 344. As a result, the position of the followers 326 within the guides 344 can indicate to a user whether or not the cable support section 320 is in a locked position.

Figure 31:
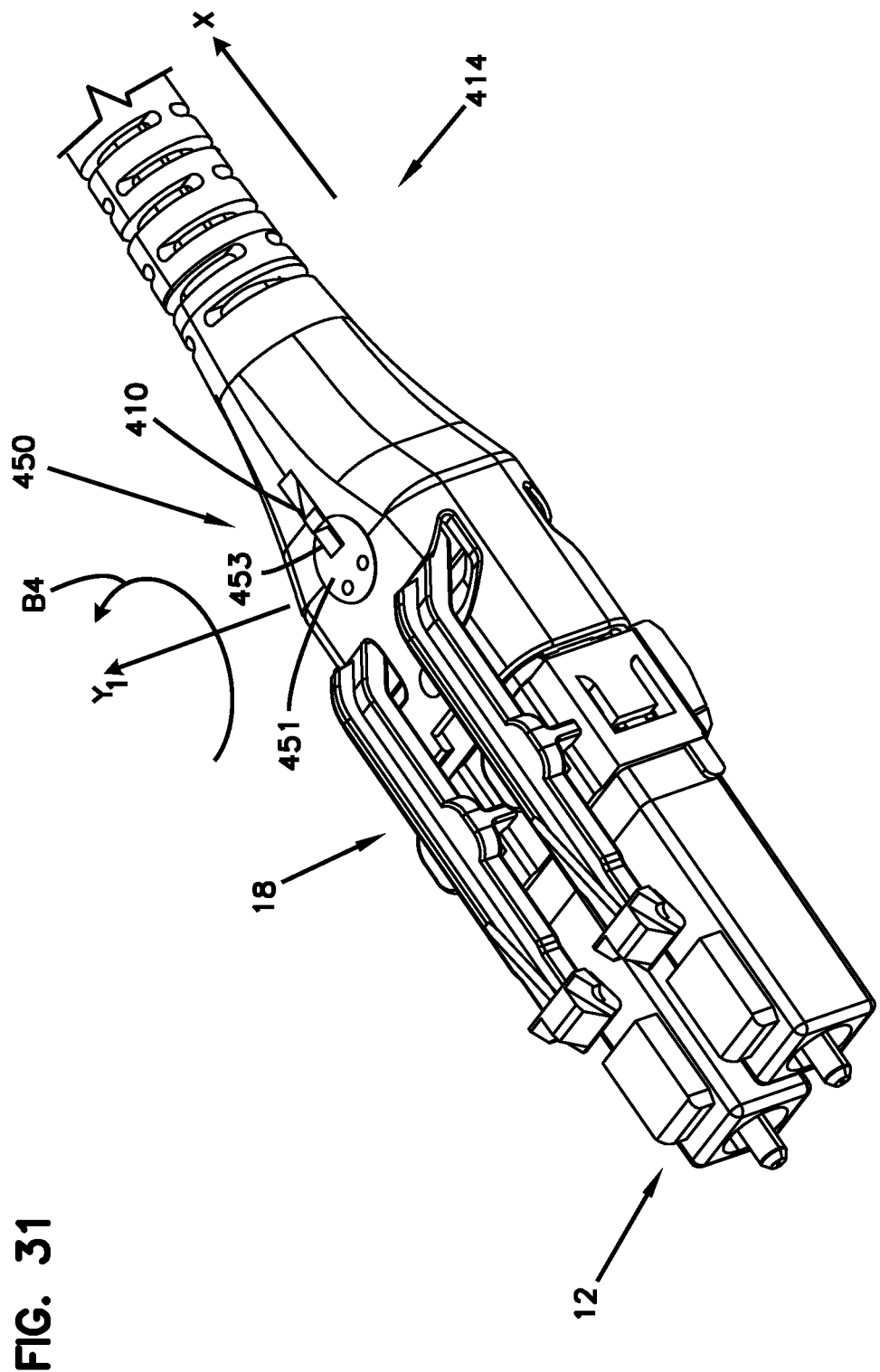
FIG. 31 is a perspective view of another example fiber optic connector in accordance with aspects of the present invention.

FIG. 31 illustrates an additional example locking assembly, intended to provide similar results as the embodiment described above. The illustrated boot 414 functions to engage a holder (not shown), the fiber-optic connector portions 12 and the latches 18 described above. The illustrated boot 414 also includes an anti-rotation assembly 450, having a key portion 451 defining a keyway 453. The key portion 451 can be rotated about an axis $Y_1$ (see rotation arrow B4 in FIG. 31) which is normal to the central axis X. Rotating the key portion 451 causes the keyway 453 to align with a shoulder 410 (or insert), which is similar to the shoulder (110) described in the embodiments above. The shoulder 410 can be pivoted into the keyway 453, inhibiting rotation of the boot 414 about the central axis X. Conversely, a user can pivot the shoulder 410 out of the keyway 453 in order to allow the boot 414 to rotate. The key portion 451 can be rotated such that the keyway 453 faces away from the shoulder 410.

Figure 32:
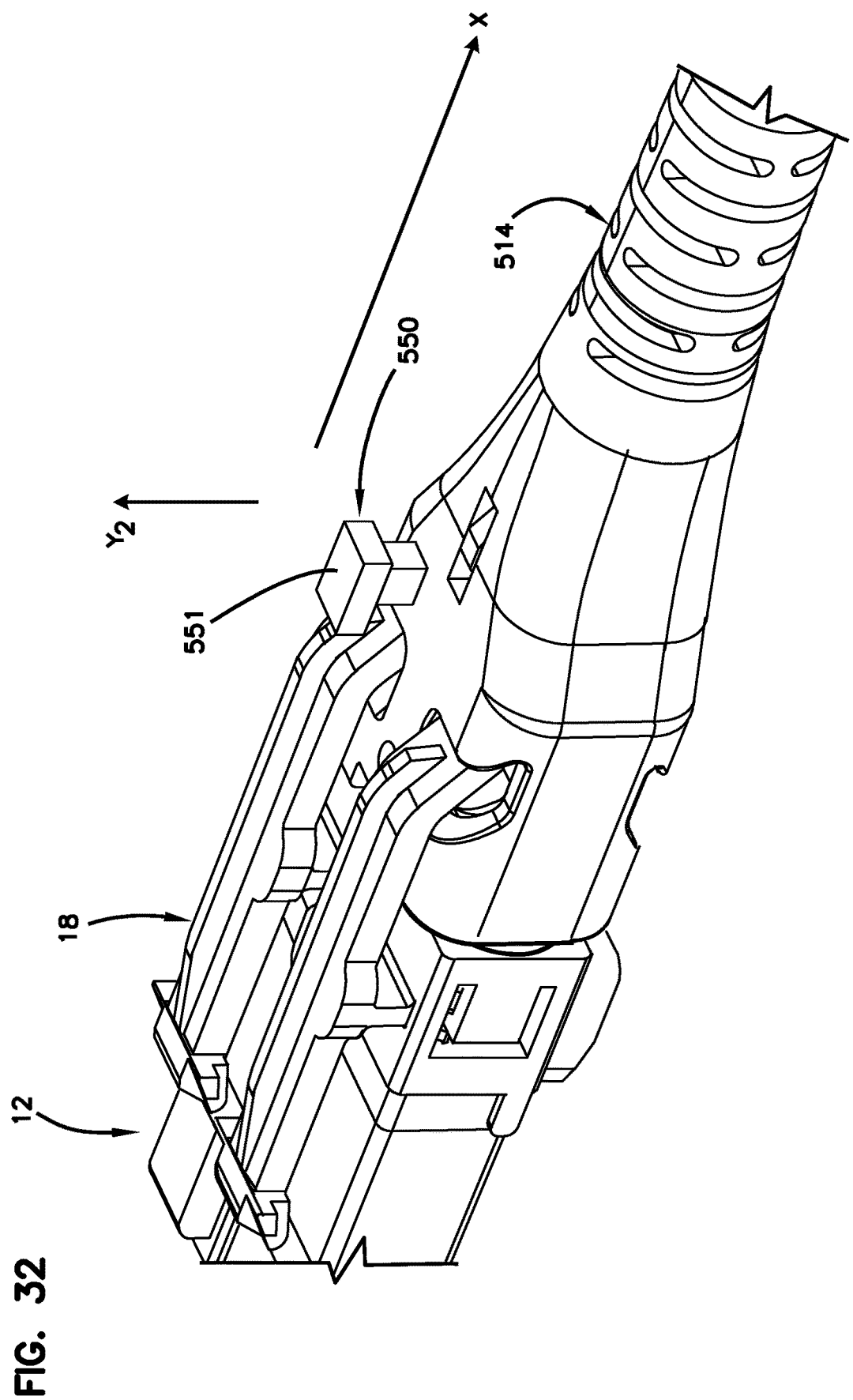
FIG. 32 is a perspective view of another example fiber optic connector in accordance with aspects of the present invention.

FIG. 32 illustrates an additional example locking assembly, intended to provide similar results as the embodiment described above. The illustrated boot 514 functions to engage a holder (not shown), the fiber-optic connector portions 12 and the latches 18 described above. The illustrated boot 514 also includes an insertable lock mechanism 550, having a handle portion 551 and an insert portion (not shown). The handle portion 551 is accessed by a user to push and pull the handle portion along an axis $Y_2$, which is normal to the central axis X. Pushing the handle portion 551 causes the insert portion to engage and disengage a corresponding receiver (not shown) on the holder. The holder can have a similar structure to the holder (96) described above, but including a receiver. Conversely, a user can pull the handle portion 551 in order to disengage the insert portion from the receiver.

The above specification, examples and data provide a complete description of the manufacture and use of the composition of the invention. Since many embodiments of the invention can be made without departing from the spirit and scope of the invention, the invention resides in the claims hereinafter appended.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

We claim:

1. A connector assembly, comprising:
   a connector portion including a latch;
   a ferrule supported by the connector portion;
   a holder holding the connector portion, the holder including a boot receiver; and
   a boot, the boot being configured to rotate relative to the boot receiver between a locked position in which the boot is locked to the boot receiver and an unlocked position in which the boot is not locked to the boot receiver,
   wherein in the locked position, the boot is configured to move the latch by pulling on the boot; and
   wherein in the unlocked position, the boot is not configured to move the latch by pulling on the boot.

2. The connector assembly of claim 1, wherein the holder and the boot rotationally couple to each other with a follower that is received in a guide.

3. The connector assembly of claim 2, wherein the boot receiver includes the follower and the boot includes the guide.

4. The connector assembly of claim 2, wherein the boot receiver is positioned inside the boot.

5. The connector assembly of claim 2, wherein the guide includes a narrowed section defined by an obstacle and positioned between an open receiving end of the guide and a closed catch end of the guide, the guide widening between the narrowed section and the closed catch end.

6. The connector assembly of claim 2, further comprising a spring configured to bias the follower towards a surface that defines the guide.

7. The connector assembly of claim 1, further comprising a cover connected to the boot such that the cover covers a portion of the boot.

8. The connector assembly of claim 7, wherein the boot is configured to rotate relative to the cover while connected to the cover.

9. The connector assembly of claim 8, wherein the boot and the cover connect to each other by a projection received in another guide, and wherein the projection moves within the guide when the boot rotates about the longitudinal axis relative to the cover while connected to the cover.

10. The connector assembly of claim 9, wherein the projection projects from an outer surface of the boot and the another guide is defined by the cover.

11. The connector assembly of claim 10, wherein a dimension of the another guide is equal to a maximum rotation distance of the boot relative to the holder.

12. The connector assembly of claim 1, including two of the connector portions,
   wherein in the locked position, the boot is configured to move the latch of each connector portion by pulling on the boot; and
   wherein in the unlocked position, the boot is not configured to move the latch of either connector portion by pulling on the boot.

13. The connector assembly of claim 1, wherein the latch is configured to latch the connector portion to a fiber optic adapter.

14. The connector assembly of claim 13, wherein in the locked position the boot is configured to move the latch by pulling on the boot to release the connector portion from the fiber optic adapter.

\* \* \* \* \*